(12) United States Patent
Kozu et al.

(10) Patent No.: US 7,687,167 B2
(45) Date of Patent: Mar. 30, 2010

(54) POWER SUPPLY UNIT

(75) Inventors: Katsumi Kozu, Sanda (JP); Toshihiko Ichinose, Ikoma (JP); Masahiro Takada, Hamana-gun (JP); Satoshi Shibutani, Hirakata (JP); So Kuranaka, Osaka (JP)

(73) Assignee: Panasonic Corporation, Osaka (JP)

( * ) Notice: Subject to any disclaimer, the term of this patent is extended or adjusted under 35 U.S.C. 154(b) by 979 days.

(21) Appl. No.: 10/894,221

(22) Filed: Jul. 19, 2004

(65) Prior Publication Data

US 2005/0014043 A1 Jan. 20, 2005

(30) Foreign Application Priority Data

Jul. 18, 2003 (JP) .............................. 2003-276980
Jul. 18, 2003 (JP) .............................. 2003-276981

(51) Int. Cl.
*H01M 8/04* (2006.01)
*H01M 8/12* (2006.01)
*H01M 8/18* (2006.01)

(52) U.S. Cl. .............................. 429/22; 429/23; 429/19

(58) Field of Classification Search .................. 429/22, 429/23, 19
See application file for complete search history.

(56) References Cited

U.S. PATENT DOCUMENTS

| 6,509,112 B1 | 1/2003 | Luft et al. |
| 6,781,343 B1 | 8/2004 | Demachi et al. |
| 6,846,586 B2 * | 1/2005 | Aramaki ..................... 429/22 |
| 2001/0008718 A1 * | 7/2001 | Kobayashi ..................... 429/9 |
| 2001/0018138 A1 * | 8/2001 | Iwase ..................... 429/13 |
| 2002/0086193 A1 * | 7/2002 | Acker et al. ..................... 429/22 |
| 2002/0187374 A1 | 12/2002 | Yamauchi et al. |

FOREIGN PATENT DOCUMENTS

| JP | 02291668 A | 12/1990 |
| JP | 2000-12059 | 1/2000 |
| JP | 2000-173636 | 6/2000 |
| JP | 2000-512797 A | 9/2000 |
| JP | 2002-204536 A | 7/2002 |
| JP | 2002-246053 A | 8/2002 |
| JP | 2003-22830 A | 1/2003 |
| WO | 02-25761 A1 | 3/2002 |

OTHER PUBLICATIONS

Japanese Office action for corresponding application JP2003-276980, Nov. 24, 2009.
Japanese Office action for corresponding application JP2003-276981, Nov. 24, 2009.

* cited by examiner

*Primary Examiner*—Patrick Ryan
*Assistant Examiner*—Karie O'Neill
(74) *Attorney, Agent, or Firm*—Pearne & Gordon LLP

(57) ABSTRACT

A clean power supply unit with a high fuel utilization rate using a fuel cell is provided. The power supply unit of the present invention comprises a fuel cell using methanol as fuel; a secondary battery for supplying power to a load; a fuel cell control part for controlling the amount of fuel and/or air supplied to the above-mentioned fuel cell; and a power converter for converting the power output from the above-mentioned fuel cell to a predetermined voltage or current, supplying power to the load and/or the above-mentioned secondary battery and controlling the supplied power so as to fall within a predetermined range including the value at which the amount of methanol discharged from the above-mentioned fuel cell becomes minimized.

10 Claims, 12 Drawing Sheets

POWER SUPPLY UNIT

BACKGROUND OF THE INVENTION

The present invention relates to a power supply unit.

In portable electronic and electrical equipments such as personal computer, a secondary battery such as lithium ion battery and nickel hydrogen battery has been used as a power supply unit. However, the secondary battery cannot feed or supply electric power to the personal computer for longer than about four consecutive hours. Recently, a fuel cell capable of feeding electric power to the personal computer for 20 to 40 consecutive hours has been getting a lot of attention.

A circulating type unit is a typical unit of a fuel cell using methanol as fuel. FIG. 9 is a block diagram showing the configuration of a prior art circulating type fuel cell. FIG. 9 shows a return pump 111, a dilution tank 112, a methanol pump 113, a methanol tank 114, a fuel cell 116, a fuel cell control part 117 and a gas-liquid separator 901. The fuel cell 116 has a stack 122, a fuel pump 123 and an air pump 124.

The methanol tank 114 stores methanol ($CH_3OH$) of several % to 100% component therein.

The methanol pump 113 feeds methanol from the methanol tank 114 into the dilution tank 112 according to an instruction of the fuel cell control part 117. The dilution tank 112 dilutes methanol of several % to 100% to 5% wt. The fuel pump 123 feeds the diluted methanol from the dilution tank 112 into the stack 122 according to an instruction of the fuel cell control part 117. The air pump 124 feeds air into the stack 122 according to an instruction of the fuel cell control part 117.

In the stack 122, methanol is supplied to a fuel electrode (−) and air is supplied to an air electrode (+). At the fuel electrode (−), methanol reacts with water to form carbon dioxide, hydrogen ions and electrons in a region called as a three-phase interface where methanol and water as reactants, catalyst (electrode surface) and electrolyte are in contact with each other ($CH_3OH+H_2O \rightarrow CO_2+6H^++6e^-$). Hydrogen ions and electrons pass through a polymer membrane and an external load, respectively, and reach the air electrode (+). At the air electrode (+), oxygen in air reacts with hydrogen ion and electron derived from the catalyst (electrode surface) on the three-phase interface to form water ($3/2O_2+6H^++6e^- \rightarrow 3H_2O$).

The stack 122 discharges the used methanol of 3 to 5% wt, carbon dioxide and water from the fuel electrode of (−) side, and water and air from the air electrode of (+) side. The gas-liquid separator 901 separates carbon dioxide from methanol, carbon dioxide and water discharged from the stack 122 and discharge it. The return pump 111 feeds remaining methanol and water into the dilution tank 112. The methanol and water are reused to generate diluted methanol in the dilution tank 112.

Patent document 1 (Unexamined Patent Publication No. 2000-173636) discloses a prior art fuel cell apparatus to which electric power is supplied from a secondary battery at the time of sudden change in an external load. FIG. 10 is a block diagram showing the configuration of the fuel cell apparatus of the patent document 1. A fuel cell main unit 1001 uses hydrogen as fuel gas. When a sudden change in the load causes an output voltage of the fuel cell main unit 1001 to be lowered temporarily to become a predetermined voltage V3 or less, output to a charge control part 1006 is stopped at a circuit switch control part 1007 in response to a signal from a sensor part 1009. When the output value further lowers to become a predetermined voltage V4 or less, output to an auxiliary device 1002 is stopped at the circuit switch control part 1007 in response to a signal from a sensor part 1009, and at the same time, the output power to the auxiliary device 1002 is switched to the output power of a secondary battery 1005. The fuel cell apparatus of the patent document 1 is controlled so as to supply power stably to the external load based on the output voltage of the fuel cell main unit 1001.

Patent document 2 (U.S. Pat. No. 2,775,890) discloses a prior art control device of fuel cell power generation system that maintains a storage battery 1106 in a state of a target charged capacity (for example 80 to 90%). FIG. 11 is a block diagram showing the configuration of the control device of fuel cell power generation system of the patent document 2. A discharge power amount computing device 1115 fetches an output of a storage battery current detector 1111 and calculates discharged charge amount of a storage battery 1106. A controller 1116 determines power to be generated from the fuel cell so as to supply power corresponding to the discharged charge to the storage battery 1106 within a period at every specific cycle, and outputs a control instruction to an auxiliary controller 1110 and a DC-DC converter 1104. The control device of fuel cell power generation system of the patent document 2 can supply power to the load stably while maintaining the storage battery 1106 in a state of a target charged capacity, based on the discharged charge of the storage battery 1106.

Patent document 3 (Unexamined Patent Publication No. 2000-12059) discloses a prior art fuel cell system and fuel cell control method that make a fuel cell operate at an operating point with the highest energy conversion efficiency. FIG. 12 is a block diagram showing the configuration of the fuel cell system of the patent document 3. A reformer 1228 generates hydrogen-rich gas (reformed gas) containing hydrogen therein by steam reforming reaction of methanol injected as fuel 1224 and water. The fuel cell 1236 generates electric power using the hydrogen-rich gas as fuel gas. A control part 1220 calculates an operating point with the highest energy conversion efficiency in the fuel cell 1236 based on the gas flow rate and makes the fuel cell 1236 operate at the operating point.

The prior art circulating type fuel cell has the deficiency of discharging a considerable amount of methanol along with carbon dioxide because of the difficulty in separating only carbon dioxide from the used fuel. For this reason, less than 10% of the amount of supplied methanol becomes available power, resulting in a low fuel utilization rate (details to be described later).

In the fuel cell, some delay occurs until the output power of the fuel cell is increased or decreased by increasing or decreasing the amount of fuel supplied to the fuel cell. In the fuel cell apparatus of the patent document 1 for example, the fuel cell is required to change the output power immediately in response to a change in the load. In the fuel cell apparatus of the patent document 1, it is necessary to continue to supply fuel of the amount much greater than a required amount to the fuel cell so as to cope with a sudden change in the load. This results in lowering of fuel utilization rate of the fuel cell. The fuel cell using methanol as fuel has the problem of discharging a large amount of methanol.

In the control device of fuel cell generation system of the patent document 2, since the generated power of the fuel cell is changed with a short cycle, it is difficult to control it, thereby to complicate the configuration of the fuel cell. As the fuel cell system and fuel cell control method of the patent document 3 require a reformer, the problem is that the system is costly and large-sized. In the patent document 3, the fuel cell 1236 is made to operate at the point with the highest energy conversion efficiency (=generating efficiency×gas utilization rate). When the fuel cell system and fuel cell control method of the patent document 3 is applied to the non-circulating type DMFC (Direct Methanol Fuel Cell), because sufficient fuel has to be supplied, a large amount of unused methanol is discharged from the fuel cell. As a result, a problem arises with the method of cleansing the discharged methanol.

A non-circulating type fuel cell is a fuel cell in which fuel is not circulated and used fuel is discharged. In such fuel cell, methanol supplied from an entrance of the fuel cell is consumed gradually and discharged from an exit of the fuel cell. However, when the supplied methanol lacks with respect to output current, the output voltage of the fuel cell is lowered rapidly. To output power stably and cope with a sudden change in the load, a large amount of unused methanol is discharged from the conventional non-circulating type fuel cell. Nevertheless, as methanol has toxicity, it cannot be discharged as it is. Since a certain amount of unused fuel is discharged, the non-circulating type fuel cell has been deemed to be unsuitable for the fuel cell using toxic methanol as fuel.

The present invention is devised in consideration with the above-mentioned problems and intends to provide a clean power supply unit.

The present invention intends to provide a power supply unit having a good fuel utilization rate.

The present invention intends to provide a power supply unit capable of supplying electric power stably in response to a power change in the load without largely changing the power generated by the fuel cell.

The present invention intends to provide a power supply unit of simple configuration.

BRIEF SUMMARY OF THE INVENTION

To solve the above-mentioned problem, a power supply unit of the present invention has the following configuration. The power supply unit from one aspect of the present invention comprises a fuel cell using methanol as fuel; a secondary battery for supplying power to a load; a fuel cell control part for controlling the amount of fuel and/or air supplied to the above-mentioned fuel cell; and a power converter for converting the power output from the above-mentioned fuel cell to a predetermined voltage or current, supplying power to the load and/or the above-mentioned secondary battery and controlling the supplied power so as to fall within a predetermined range in which the amount of methanol discharged from the above-mentioned fuel cell becomes minimized.

The present invention has the effect of realizing a clean power supply unit. As the power supply unit is controlled so as to use up almost all of the fuel, it has a high utilization rate of the fuel cell. By supplying a predetermined power by the fuel cell and supplying the deficient power by the secondary battery, the present invention has the effect of realizing the power supply unit capable of addressing load fluctuation while activating the fuel cell at a certain degree of constant condition. As it is not required to improve responsiveness of the fuel cell to load fluctuation, the present invention has the effect of realizing the power supply unit of simple configuration.

Conventionally, the idea of driving the fuel cell in the condition where almost no methanol is discharged from the fuel cell has not been conceived. For example, in the fuel cell system and fuel cell control method of the patent document 3, on the condition of supplying a sufficient amount of fuel to the fuel cell, the fuel cell is made to operate at the operating point with the highest energy conversion efficiency. Therefore, the operating condition of the fuel cell described in the patent document 3 is completely different from that of the fuel cell of the present invention.

The power supply unit from another aspect of the present invention comprises a fuel cell using methanol as fuel; a secondary battery for supplying power to a load; a fuel cell control part for supplying a certain amount of fuel per unit of time to the above-mentioned fuel cell in at least predetermined power generation mode; and a power converter for converting the power output from the above-mentioned fuel cell to a predetermined voltage or current, supplying power to the load and/or the above-mentioned secondary battery, supplying a certain amount of fuel per unit of time to the above-mentioned fuel cell and controlling the supplied power so as to fall within a predetermined range including the value at which the output power of the above-mentioned fuel cell becomes maximized.

The present invention has the effect of realizing the power supply unit that can control the fuel cell easily and has a high fuel utilization rate of the fuel cell. As almost all of the fuel supplied to the fuel cell is used up, a clean power supply unit can be realized.

In the above-mentioned power supply unit from another aspect of the present invention, the above-mentioned power converter controls the output current of the above-mentioned fuel cell to become a target current (controls the output current to get closer to the target current. Generally, an error remains.), and the above-mentioned target current has a value greater than the output current value at which the output power of the above-mentioned fuel cell substantially becomes maximized by a predetermined value.

The present invention has the effect of realizing the power supply unit that can control the fuel cell easily and has a high fuel utilization rate of the fuel cell.

In the above-mentioned power supply unit from another aspect of the present invention, the above-mentioned power converter controls the output voltage of the above-mentioned fuel cell to become a target voltage (It is for controlling the output voltage to get closer to the target voltage. Generally, an error remains.). The above-mentioned target voltage has a value lower than the output voltage value at which the output power of the above-mentioned fuel cell substantially becomes maximized by a predetermined value.

The present invention has the effect of realizing the power supply unit that can control the fuel cell easily and has a high stability and a high fuel utilization rate of the fuel cell.

In the above-mentioned power supply unit from another aspect of the present invention further comprises a secondary battery residual capacity detector for detecting the residual capacity of the above-mentioned secondary battery, and the above-mentioned fuel cell control part has plural power generation modes that are switched based on at least residual capacity of the above-mentioned secondary battery and supplies a certain amount of fuel per unit of time as a value varying among power generation modes to the above-mentioned fuel cell.

The present invention has the effect of realizing the power supply unit that supplies appropriate power depending on the residual capacity of the secondary battery by using a simple control method. When the amount of fuel per unit of time supplied to the fuel cell is switched, the fuel utilization rate deteriorates transitionally. For example, by setting the number of power generation modes as 2 or 3, the number of times of switching the amount of fuel per unit of time supplied to the fuel cell can be minimized. The clean power supply unit with a further higher fuel utilization rate of the fuel cell can be realized.

In the above-mentioned power supply unit from another aspect of the present invention, the above-mentioned secondary battery residual capacity detector detects the residual capacity of the above-mentioned secondary battery based on the voltage of the above-mentioned secondary battery.

Methods of detecting the residual capacity of the secondary battery include a method of detecting the current of the secondary battery and calculating the time integral value. However, this method has the problem of accumulating errors gradually. For example, a lithium battery is used as the secondary battery, by detecting the voltage of the secondary battery, the residual capacity can be detected without accumulating an error. When the secondary battery is close to become charged completely, the power supplied by the fuel cell is set to be smaller than total power supplied to the load. The secondary battery gradually discharges. This prevents the secondary battery from being overcharged. When the secondary battery is close to become discharged completely, the power supplied by the fuel cell is set to be larger than total power supplied to the load. The secondary battery is charged gradually. This prevents the secondary battery from being overdischarged.

In the above-mentioned power supply unit from another aspect of the present invention, the above-mentioned fuel cell is a balance type fuel cell that keeps a balance between the fuel and the output power of the above-mentioned fuel cell.

The present invention has the effect of realizing the compact and low-cost power supply unit requiring no separator. The present invention has the effect of realizing the power supply unit with a higher fuel utilization rate of the fuel cell than the conventional non-circulating type fuel cell or the conventional circulating type fuel cell.

In the above-mentioned power supply unit from another aspect of the present invention, when the residual capacity of the above-mentioned secondary battery decreases and reaches a first residual capacity, the amount of fuel supplied to the above-mentioned fuel cell is switched from the first value to a second value which is greater than the first value, and when the residual capacity of the above-mentioned secondary battery increases and reaches the second residual capacity greater than the first residual capacity, the amount of fuel supplied to the above-mentioned fuel cell is switched from the above-mentioned second value to the above-mentioned first value.

When the amount of fuel per unit of time supplied to the fuel cell is switched, the fuel utilization rate deteriorates transitionally. By providing hysteresis with the switching condition of the amount of fuel supplied to the fuel cell, the amount of fuel supplied to the fuel cell can be prevented from switching frequently. This can realize the power supply unit with a further higher fuel utilization rate of the fuel cell.

In the above-mentioned power supply unit from another aspect of the present invention, the above-mentioned fuel cell control part has at least three power generation modes.

In the present invention, a standard value of 1 or more other than a minimum value and a maximum value is provided as the amount of fuel per unit of time supplied to the fuel cell. For example, in the case of the standard value, when the same power as the consumed power is supplied to the load, the secondary battery is not charged or discharged for the period. The state where the amount of fuel supplied to the fuel cell is set constant can be maintained for a long time. This can realize the power supply unit with a further higher fuel utilization rate of the fuel cell.

In the above-mentioned power supply unit from another aspect of the present invention, the above-mentioned three values are a maximum value, an intermediate value and a minimum value, in the state where the amount of fuel supplied to the above-mentioned fuel cell is the intermediate value, when the residual capacity of the above-mentioned secondary battery reaches a maximum threshold, the amount of fuel supplied to the above-mentioned fuel cell is switched to the minimum value, in the state where the amount of fuel supplied to the above-mentioned fuel cell is the minimum value, when the residual capacity of the above-mentioned secondary battery decreases and reaches an intermediate threshold, the amount of fuel supplied to the above-mentioned fuel cell is switched to the intermediate value, in the state where the amount of fuel supplied to the above-mentioned fuel cell is the intermediate value, when the residual capacity of the above-mentioned secondary battery decreases and reaches a minimum threshold, the amount of fuel supplied to the above-mentioned fuel cell is switched to the maximum value, and in the state where the amount of fuel supplied to the above-mentioned fuel cell is of maximum value, when the residual capacity of the above-mentioned secondary battery increases and reaches the above-mentioned intermediate threshold, the amount of fuel supplied to the above-mentioned fuel cell is switched to the intermediate value.

In the present invention, hysteresis is provided with the switching condition of the amount of fuel supplied to the fuel cell, and a standard value (intermediate value) other than a minimum value and a maximum value is provided as the amount of fuel per unit of time supplied to the fuel cell. As this standard value balances with the average power supplied to the load, activating time in the standard value becomes long. This can realize the power supply unit with a further higher fuel utilization rate of the fuel cell.

In the above-mentioned power supply unit from another aspect of the present invention, the above-mentioned three values are a maximum value, an intermediate value and a minimum value, in the state where the amount of fuel supplied to the above-mentioned fuel cell is the intermediate value, when the residual capacity of the above-mentioned secondary battery reaches a maximum threshold, the amount of fuel supplied to the above-mentioned fuel cell is switched to the minimum value, in the state where the amount of fuel supplied to the above-mentioned fuel cell is the minimum value, when the residual capacity of the above-mentioned secondary battery decreases and reaches a first intermediate threshold, the amount of fuel supplied to the above-mentioned fuel cell is switched to the intermediate value, in the state where the amount of fuel supplied to the above-mentioned fuel cell is the intermediate value, when the residual capacity of the above-mentioned secondary battery decreases and reaches a minimum threshold, the amount of fuel supplied to the above-mentioned fuel cell is switched to the maximum value, and in the state where the amount of fuel supplied to the above-mentioned fuel cell is of maximum value, when the residual capacity of the above-mentioned secondary battery increases and reaches a second intermediate threshold, the amount of fuel supplied to the above-mentioned fuel cell is switched to the intermediate value.

In the present invention, two intermediate thresholds other than the minimum threshold and the maximum threshold of the residual capacity of the secondary battery are provided as a switching condition of the amount of fuel supplied to the fuel cell. This reduces the frequency of switching the amount of fuel supplied to the fuel cell. This can realize the power supply unit with a further higher fuel utilization rate of the fuel cell.

In the above-mentioned power supply unit from another aspect of the present invention, when the above-mentioned fuel cell increases the output power, the amount of fuel is increased and then the power supplied by the above-mentioned power converter is increased, and when the above-mentioned fuel cell decreases the output power, the power supplied by the above-mentioned power converter is decreased and then the amount of fuel is decreased.

When methanol supplied becomes short for the output current, the output voltage of the fuel cell lowers sharply. According to the present invention, it is possible to prevent the output voltage of the fuel cell from lowering sharply at the switching of the amount of fuel supplied to the fuel cell. The fuel cell that supplies power stable can be realized. In the above-mentioned power supply unit from another aspect of the present invention, in the power generation mode where the amount of fuel supplied to the above-mentioned fuel cell is the minimum value, the output power of the above-mentioned fuel cell is substantially same as a self-power consumption of the power supply unit.

For example, when the load goes into a power saving mode or stand-by mode and the power consumption becomes very small, the power supply unit of the present invention shifts into the power generation mode where the amount of fuel supplied to the fuel cell is the minimum value. At this time, the output power of the fuel cell is substantially same as a self-power consumption of the power supply unit. As methanol is hardly discharged from the fuel cell, the fuel cell maintains the state with an extremely high fuel utilization rate. As the secondary battery is hardly charged or discharged, the state can be kept stably for a long time.

In the above-mentioned power supply unit from another aspect of the present invention, when the above-mentioned power supply unit is activated, the above-mentioned fuel cell control part sets the power generation mode where the amount of fuel supplied to the above-mentioned fuel cell is the minimum value as an initialization mode.

It takes some time period (for example, about 15 minutes) until the fuel cell can supply power to the load after activation (until the fuel cell reaches a predetermined temperature.). During the time period, power cannot be supplied to the load. In addition, for the period, the fuel cell discharges a great deal of unused methanol. In the present invention, until the fuel cell can operate after activation, by setting the power generation mode where the amount of fuel supplied to the fuel cell is the minimum value as an initialization mode, the absolute amount of methanol discharged from the fuel cell can be minimized. This can minimize the amount of methanol to be processed by the clarification part at activation. The present invention can realize the clean power supply unit.

The novel features of the invention are set forth with particularity in the appended claims. The invention as to both structure and content, and other objects and features thereof will best be understood from the detailed description when considered in connection with the accompanying drawings.

Part or All of the drawings are drawn schematically for diagrammatic representation and it should be considered that they do not necessarily reflect relative size and position of components shown therein.

DETAILED DESCRIPTION OF THE INVENTION

Embodiments that specifically describe best modes for conducting the present invention will be described referring to figures below.

First Embodiment

Referring to FIGS. 1 to 6, a power supply unit of a first embodiment will be described.

Figure 1:
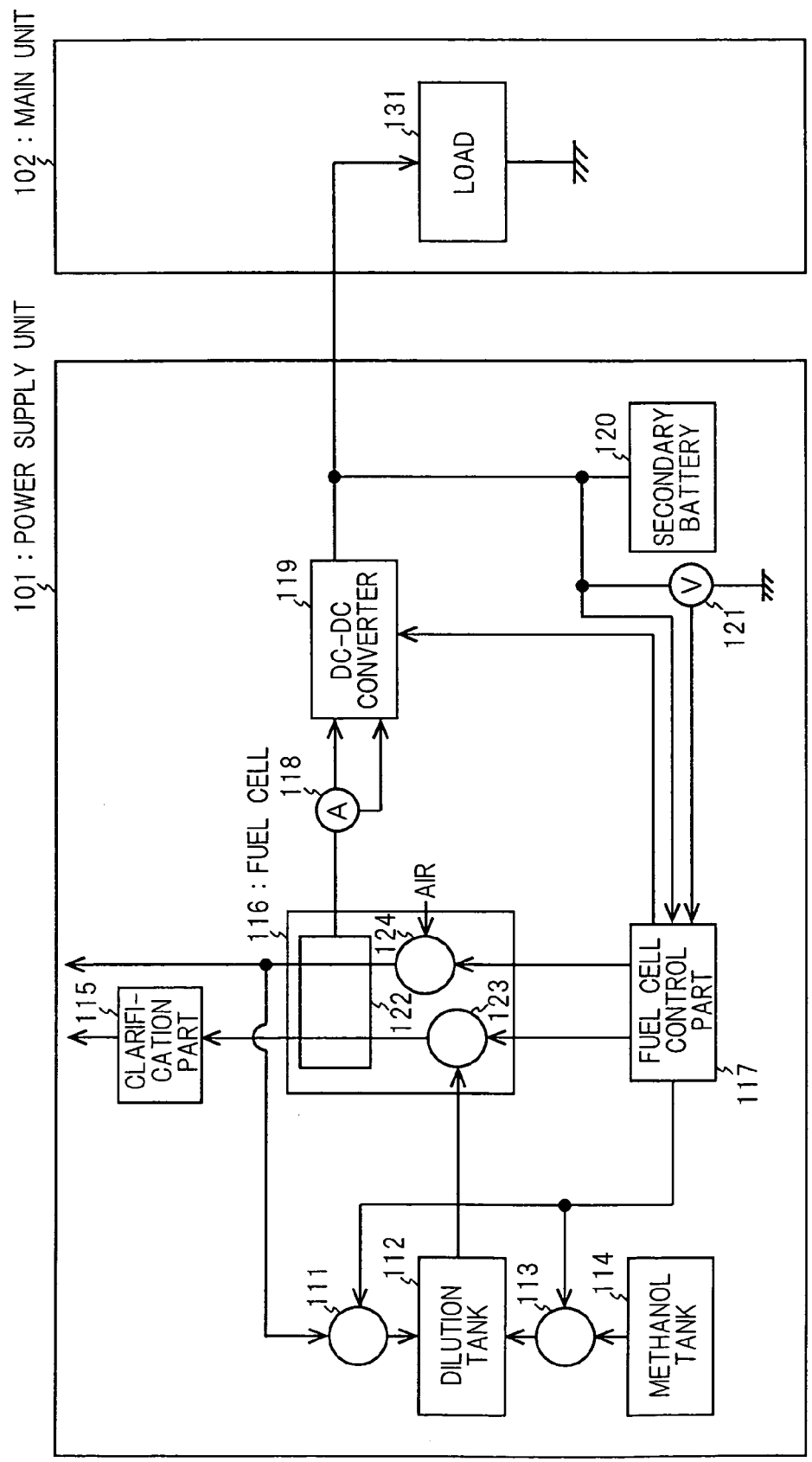
FIG. 1 is a block diagram showing the configuration of a power supply unit in accordance with a first embodiment of the present invention.

Firstly, the configuration of the power supply unit in accordance with the first embodiment will be described. FIG. 1 is a block diagram showing the configuration of the power supply unit in accordance with the first embodiment. FIG. 1 shows a power supply unit 101 and a main unit 102. The power supply unit 101 has a return pump 111, a dilution tank 112, a methanol pump 113, a methanol tank 114, a clarification part 115, a fuel cell 116, a fuel cell control part 117, a fuel cell output current detector 118 for detecting output current of the fuel cell 116, a DC-DC converter 119, a secondary battery 120 and a secondary battery output voltage detector 121 for detecting the output voltage of the secondary battery 120. The fuel cell 116 has a stack 122, a fuel pump 123 and an air pump 124. The main unit 102 has a load 131, for instance, a CPU.

The fuel cell 116 is a balance type fuel cell using methanol as fuel (non-circulating type fuel cell that keeps the amount of used fuel and output electric power in balance). The secondary battery 120 is a lithium-ion secondary battery. The secondary battery 120 has a capacity of 16 Wh. The methanol tank 14 stores methanol ($CH_3OH$) of several % to 100% therein. The main unit 102 is a personal computer.

The output power of the fuel cell 116 is controlled so as to reach a target current by the DC-DC converter 119. When the power output from the fuel cell 116 (DC-DC converter 119) has a surplus even after being supplied to the main unit 102, the power supply unit 101 supplies the output power of the fuel cell 116 to the main unit 102 and charges the secondary battery 120 by the surplus power. When the output power of the fuel cell 116 is insufficient to be supplied to the main unit 102, the secondary battery 120 discharges the deficient power. The power supply unit 101 supplies combined power of the output power of the fuel cell 116 and the power discharged from the secondary battery 120 to the main unit 102.

The fuel cell control part 117 has three power generation modes and feeds a certain amount of fuel per unit of time, which varies among power generation modes, to the fuel cell 116. The fuel cell control part 117 finds residual capacity of the secondary battery 120 from output voltage of the secondary battery 120 detected by the secondary battery output voltage detector 121. Depending on the residual capacity of the secondary battery 120, the fuel cell control part 117 selects a power generation mode (output power of the fuel cell 116 is controlled) (details to be described later). According to the selected power generation mode, the fuel cell control part 117 informs the DC-DC converter 119 of a target input current. As described later, when a certain amount of fuel is supplied to the fuel cell, relationship between output voltage and output current is represented as a definite function on a graph. The DC-DC converter 119 controls the output current so that the output current of the fuel cell 116 detected by the fuel cell output current detector 118 (input-current of the DC-DC converter 119) corresponds with the target input current as far as possible. That is, the fuel cell 116 outputs a predetermined output power (=Output current of the fuel cell 116×output voltage corresponding to the output current), and the DC-DC converter 119 converts the output power of the fuel cell 116 and supplies the converted power to the load 131 and/or the secondary battery 120.

Specifically, the fuel cell control part 117 adjusts the amount of fuel and air to be supplied to the fuel cell 116 by using the return pump 111, the methanol pump 113, the fuel pump 123 and the air pump 124. The methanol pump 113 feeds methanol from the methanol tank 114 into the dilution tank 112 according to an instruction of the fuel cell control part 117. The dilution tank 112 dilutes methanol of several % to 100% to methanol of 6% wt. The fuel pump 123 feeds the diluted methanol from the dilution tank 112 into the stack 122 according to an instruction of the fuel cell control part 117. The air pump 124 feeds air into the stack 122 according to an instruction of the fuel cell control part 117.

In the stack 122, methanol is fed to a fuel electrode (−) and air is fed to an air electrode (+). At the fuel electrode (−), methanol reacts with water to form carbon dioxide, hydrogen ion and electron ($CH_3OH+H_2O \rightarrow CO_2+6H^++6e^-$). The hydrogen ion and the electron pass through a polymer membrane and an external load, respectively, and reach the air electrode (+). At the air electrode (+), oxygen in air reacts with hydrogen ion and electron derived from the electrode surface to form water ($3/2O_2+6H^++6e^- \rightarrow 3H_2O$).

The stack 122 discharges further diluted methanol of 0.5% wt, carbon dioxide and water from the fuel electrode (−) side. The clarification part 115 clarifies the discharged methanol by converting to carbon dioxide and water by catalyst. The stack 122 discharges water and air from the air electrode (+) side. The return pump 111 feeds water discharged from the air electrode (+) side into the dilution tank 112. Water discharged from the air electrode (+) side is reused as a solvent for diluting methanol in the dilution tank 112.

Figure 2:
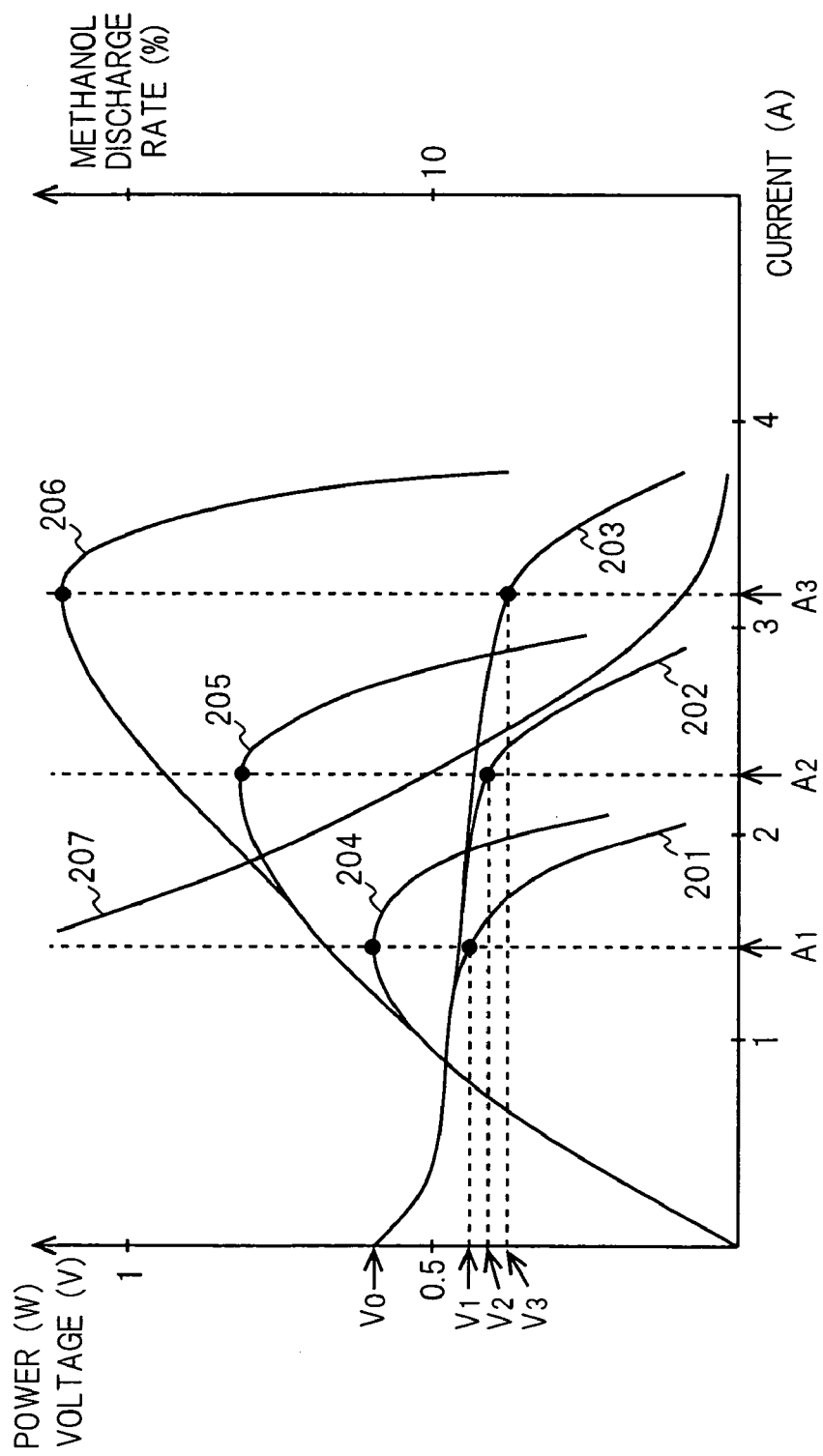
FIG. 2 is a graph showing output current-output voltage characteristic, output current-output power characteristic and output current-methanol discharge rate characteristic by amount of fuel of a balance type fuel cell of the power supply unit in accordance with the first and second embodiments of the present invention.

FIG. 2 is a graph showing output current-output voltage characteristic, output current-output power characteristic and output current-methanol discharge rate characteristic by amount of fuel of the balance type fuel cell of the power supply unit in accordance with the first embodiment of the present invention. In FIG. 2, a horizontal axis represents output current (A) and a vertical axis represents output voltage (V) and output power (W). Numerals 201, 202 and 203 represent output current-output voltage characteristic in the case of the amount of fuel of 0.1 cc/min, 0.2 cc/min and 0.3 cc/min, respectively. Numerals 204, 205 and 206 represent output current-output power characteristic in the case of the amount of fuel of 0.1 cc/min, 0.2 cc/min and 0.3 cc/min, respectively. Numeral 207 represents discharge rate of methanol discharged from the fuel cell 116 in the case of the amount of fuel of 0.3 cc/min. The output current-output voltage characteristic and output current-output power characteristic vary depending on the amount of fuel supplied to the fuel cell 116. Once the amount of fuel is determined to be a certain value, the output current-output voltage characteristic and output current-output power characteristic in the amount of fuel are determined uniquely.

The power supply unit 101 of the first embodiment controls output of the fuel cell 116 at a constant current. The case where the amount of fuel of 0.3 cc/min is used will be described. For the output current-output power characteristic 206, when the output current (A) ranges from 0 to $A_3$, the output power increases as the output current increases. When the output current (A) is $A_3$, the output power reaches at a maximum value. When the output current (A) exceeds $A_3$, the output power decreases sharply as the output current increases. For the output current-output voltage characteristic 203, when the output current (A) ranges from 0 to $A_3$, the output voltage remains stable with a gradual decrease as the output current increases. When the output current (A) exceeds $A_3$, the rate of decrease in output voltage become greater as the output current increases.

For the methanol discharge rate 207, as the output current (A) of the fuel cell 116 increases from 0 to $A_3$, the amount of discharged methanol (the amount of residual methanol in emission matter from the fuel cell 116) decreases. When the output current (A) reaches $A_3$, the amount of discharged methanol becomes very small. When the output current further increases, the amount of discharged methanol decreases slightly.

In other words, when the output current (A) ranges from 0 to $A_3$, the fuel cell 116 discharges remaining methanol without using up all supplied methanol. When the output current (A) becomes $A_3$ or greater, the fuel cell uses up almost all supplied methanol and discharges only a little amount of methanol. When the output current (A) is greater than $A_3$ by a predetermined amount or more, the output voltage of the fuel cell 116 decreases sharply. The same also applies to the cases where the amount of fuel of 0.2 cc/min and 0.1 cc/min are used.

The balance type fuel cell in accordance with the first embodiment of the present invention feeds a certain amount of fuel per unit of time to the fuel cell 116 in each power generation mode and generates power in the range from the current value at which output power becomes maximized with the amount of fuel to the value greater than the above-mentioned current value by a predetermined value. The above-mentioned range is determined depending on the amount of fuel.

Based on the output current-output voltage characteristic and output current-output power characteristic using the amount of fuel as parameter (for example, FIG. 2), the fuel cell control part 117 of the power supply unit 101 in accordance with the first embodiment correlates a certain amount of fuel in each power generation mode with a target output current value corresponding to the amount of fuel (in the range from the current value at which the output power becomes maximized to the value greater than the current value by a predetermined value (the current value before sharp decrease in output voltage) by using the amount of fuel) and stores them therein. The fuel cell control part 117 informs the DC-DC converter 119 of the target output current value corresponding to the amount of fuel. For example, when methanol of 0.1 cc/min is supplied to the stack 122, the fuel cell control part 117 instructs the DC-DC converter 119 so that the output current value of the fuel cell 116 falls within the range of A1 to A1+α (α is a positive number) based on the above-mentioned characteristic graph.

Figure 3:
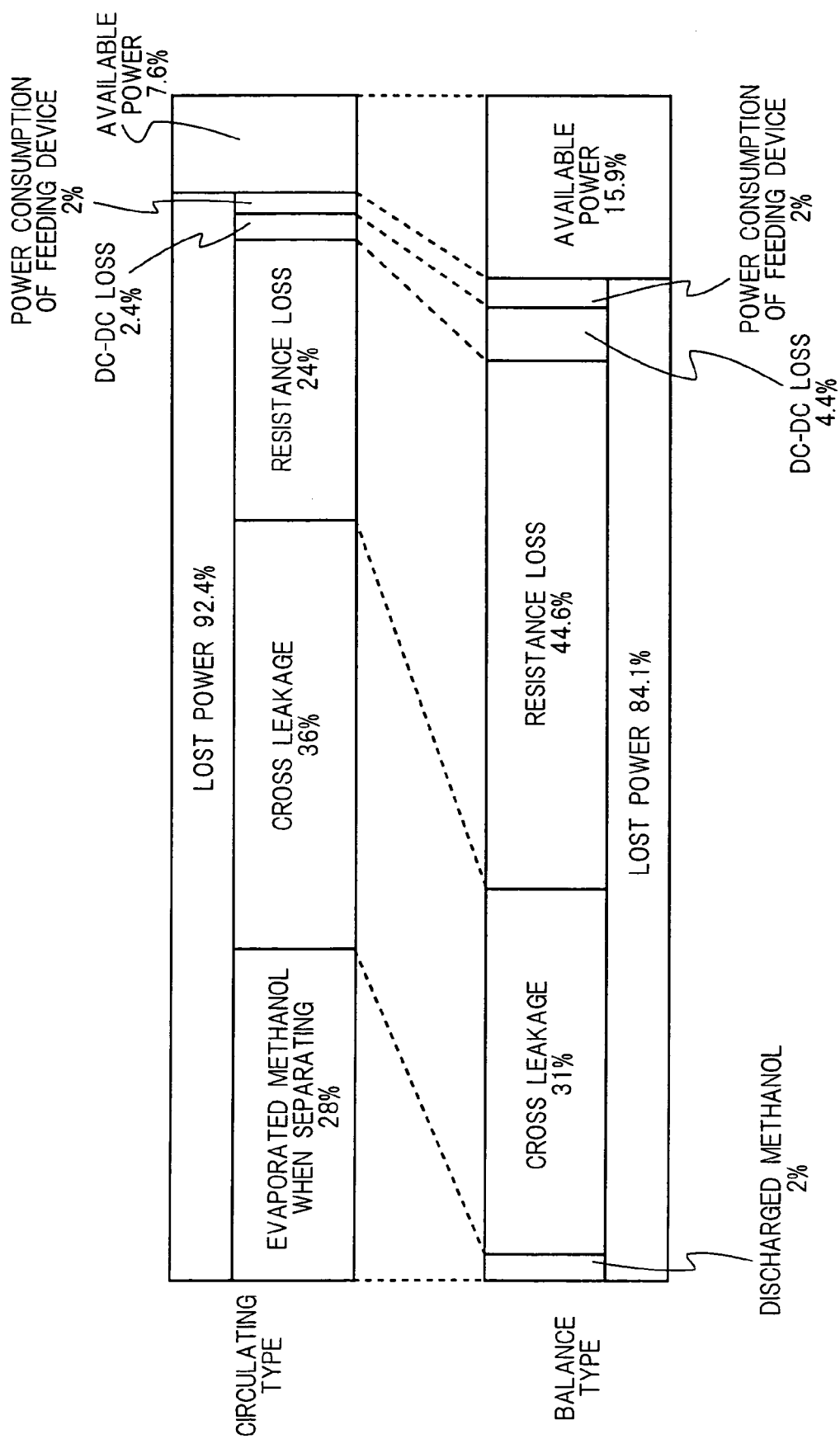
FIG. 3 is a view showing fuel utilization rate of a prior art circulating type fuel cell and the balance type fuel cell in accordance with the first embodiment of the present invention.

FIG. 3 is a view showing fuel utilization rate of the prior art circulating type fuel cell and the balance type fuel cell in accordance with the first embodiment of the present invention. FIG. 3 shows the amounts of available power and lost power assuming the amount of power indicated by converting supplied methanol to electric power without any loss as 100%. The prior art circulating type fuel cell is different vastly from the balance type fuel cell in accordance with the first embodiment of the present invention in loss due to evaporation when separating. In the prior art circulating type fuel cell, as it is difficult to separate only carbon dioxide and discharge it, methanol is also discharged along with carbon dioxide. Accordingly, in the prior art circulating type fuel cell, 28% of the supplied methanol is lost due to evaporation when separating. As a large amount of toxic methanol is not allowed to be discharged into the air as it is, a measure for clarifying the large amount of methanol (for converting to carbon dioxide and water) is required.

On the other hand, as illustrated in FIG. 2, the balance type fuel cell in accordance with the first embodiment of the present invention generates power in the range from the current value at which the output power becomes maximized to the value greater than the current value by a predetermined value. For this reason, almost all of the supplied methanol is used and only a little amount of methanol is discharged. Accordingly, the balance type fuel cell in accordance with the first embodiment of the present invention discharges only 2% of the supplied methanol. The small amount of discharged methanol can be easily clarified in the clarification part 115.

As a result, while the amount of available power constitutes 7.6% (amount of lost power constitutes 92.4%) of the output power in the prior art circulating type fuel cell, the amount of available power constitutes 15.9% (amount of lost power constitutes 84.1%) of the output power in the balance type fuel cell in accordance with the first embodiment of the present invention. The balance type fuel cell in accordance with the first embodiment of the present invention can supply power more than twice as much as the conventional fuel cell with the same fuel.

As seen from the output current-output voltage characteristic in FIG. 2, when the output current exceeds the above-mentioned range of output current even if only slightly, the output voltage decreases sharply. For this reason, a rapid change in the output power of the fuel cell 116 is undesirable because the output voltage may decrease sharply. In this embodiment, the secondary battery 120 responds to a rapid change in the power supplied to the load, the fuel cell 116 may continue to supply a certain amount of power in one power generation mode. In the first embodiment, it is possible to maintain the state where the output current substantially corresponds with the target output current value (within the range from the current value at which the output power becomes maximized to the value greater than the current value by a predetermined value with the amount of fuel).

Next, the method for controlling the power supply unit of the first embodiment will be described. The method for controlling the power supply unit in accordance with the first embodiment of the present invention is a control method by which the fuel cell 116 can maintain constant output power as much as possible.

The operation mode of the main unit 102 in accordance with the first embodiment of the present invention can be broadly categorized into four operation modes based on the rough value of average power consumption. Referring to the following table 1, the four operation modes of the main unit 102 (personal computer) will be described.

TABLE 1

| | Operation mode | Feature | Average power consumption of main unit |
|---|---|---|---|
| 1 | USB equipment, PC card connection | short time | 20 W |
| 2 | moving image playback | long time | 14 W |
| 3 | key entry operation | long time, high frequency | 10 W |
| 4 | stand-by, stop | long time, high frequency, immediate activation | 0.5 W |

A first operation mode refers to a mode in which USB (Universal Serial Bus) equipment (for example, hard disk drive connected by using USB), PC card and so on are connected to a personal computer and these interconnect equipments are activated. As the interconnect equipments are activated actually in the first operation mode, the mode is used for short time. As activation of equipments requires much electric power, the average power consumption in the first operation mode is 20 W.

In the second operation mode, moving image is played back in PC. The average power consumption in the second operation mode is 14 W.

In the third operation mode, application software is performed in PC (for example, key entry operation in word-processor). Generally, this operation mode is most frequently and longest used mode in the four operation modes. The average power consumption in the third operation mode is 10 W.

The fourth operation mode refers to a mode in which PC is in a stand-by or stop state. The fourth operation mode is the second frequently and longest used mode following the third operation mode. The average power consumption in the fourth operation mode is 0.5 W.

The average power consumption required to activate the main unit is 14 W.

The fuel cell 116 in accordance with the first embodiment of the present invention has three power generation modes by generated power: maximum value (17 W generation mode), intermediate value (13 W generation mode) and minimum value (3 W generation mode). The DC-DC converter 119 outputs 17 W, 13 W or 3 W in each power generation mode. Referring to the following table 2, the three power generation modes of the fuel cell 116 will be described.

Table 2 shows charged or discharged power of the secondary battery 120 when combining the operation mode of the main unit 102 and the power generation mode of the fuel cell 116. Power for operating the fuel cell 116 itself (self-power consumption) is 3 W in any of the power generation modes. In Table 2, total power consumption is sum value of the average power consumption of the main unit 102 (Table 1) and the self-power consumption of the fuel cell 116 (3 W). In Table 2, the charged or discharged power of the secondary battery 120=the average power consumption of the main unit 102 (Table 1)+the self-power consumption of the fuel cell 116 (3 W)−power generation of the fuel cell 116 (positive value and negative value means discharge and charge, respectively).

TABLE 2

| | operation mode | total power consumption | 17 W power | 13 W power | 3 W power |
|---|---|---|---|---|---|
| 1 | USB equipment, PC card connection | 23 W | 6 W discharge | 10 W discharge | 20 W discharge |
| 2 | moving image playback | 17 W | none | 4 W discharge | 14 W discharge |
| 3 | key entry operation | 13 W | 4 W charge | none | 10 W discharge |
| 4 | stand-by, stop | 3.5 W | 13.5 W charge | 9.5 W charge | 0.5 W discharge |

When the main unit 102 is in the third operation mode used most frequently (during key entry operation), the generated power of the fuel cell 116 in the state where the secondary battery 120 is not charged or discharged is 13 W. Thus, the intermediate value of the generated power is set as 13 W. While the main unit 102 is in the second frequently used fourth operation mode (stand-by or stop state), the generated power of the fuel cell 116 in the state where the secondary battery 120 is hardly charged or discharged is 3.5 W. Thus, the minimum value of the generated power is set as 3 W.

When the main unit 102 is in the third operation mode, and the generated power of the fuel cell 116 is the intermediate value (13 W generation mode), the secondary battery 120 is hardly charged or discharged. The fuel cell 116 can keep the 13 W generation mode for a long time. Similarly, while the main unit 102 is in the fourth operation mode, when the generated power of the fuel cell 116 is the minimum value (3 W generation mode), the output power of the fuel cell 116 is substantially same as the self-power consumption of the power supply unit 101. While the secondary battery 120 discharges 0.5 W, the fuel cell 116 can keep the 3 W generation mode over ten-odd hours.

In case the fuel cell 116 is in the 17 W generation mode, when the main unit 102 is in the first operation mode, the secondary battery 120 discharges 6 W (=20+3−17). When the main unit 102 is in the second operation mode, the secondary battery 120 is not charged or discharged (0=14+3−17). When the main unit 102 is in the third operation mode, the secondary battery 120 is charged with 4 W (=|10+3−17|). When the main unit 102 is in the fourth operation mode, the secondary battery 120 is charged with 13.5 W (=|0.5+3−17|).

In case the fuel cell 116 is in the 13 W generation mode, when the main unit 102 is in the first operation mode, the secondary battery 120 discharges 10 W (=20+3−13). When the main unit 102 is in the second operation mode, the secondary battery 120 discharges 4 W (=14+3−13). When the main unit 102 is in the third operation mode, the secondary battery 120 is not charged or discharged (0=10+3−13). When the main unit 102 is in the fourth operation mode, the secondary battery 120 is charged with 9.5 W (=|0.5+3−3|).

In case the fuel cell 116 is in the 3 W generation mode, when the main unit 102 is in the first operation mode, the secondary battery 120 discharges 20 W (=20+3−3). When the main unit 102 is in the second operation mode, the secondary battery 120 discharges 14 W (=14+3−3). When the main unit 102 is in the third operation mode, the secondary battery 120 discharges 10 W (=10+3−3). When the main unit 102 is in the fourth operation mode, the secondary battery 120 discharges 0.5 W (=0.5+3−3).

As described above, the fuel cell control part 117 finds residual capacity of the secondary battery 120 from the output voltage of the secondary battery 120. Depending on the residual capacity of the secondary battery 120, the fuel cell control part 117 selects the power generation mode of the fuel cell 116.

Figure 4:
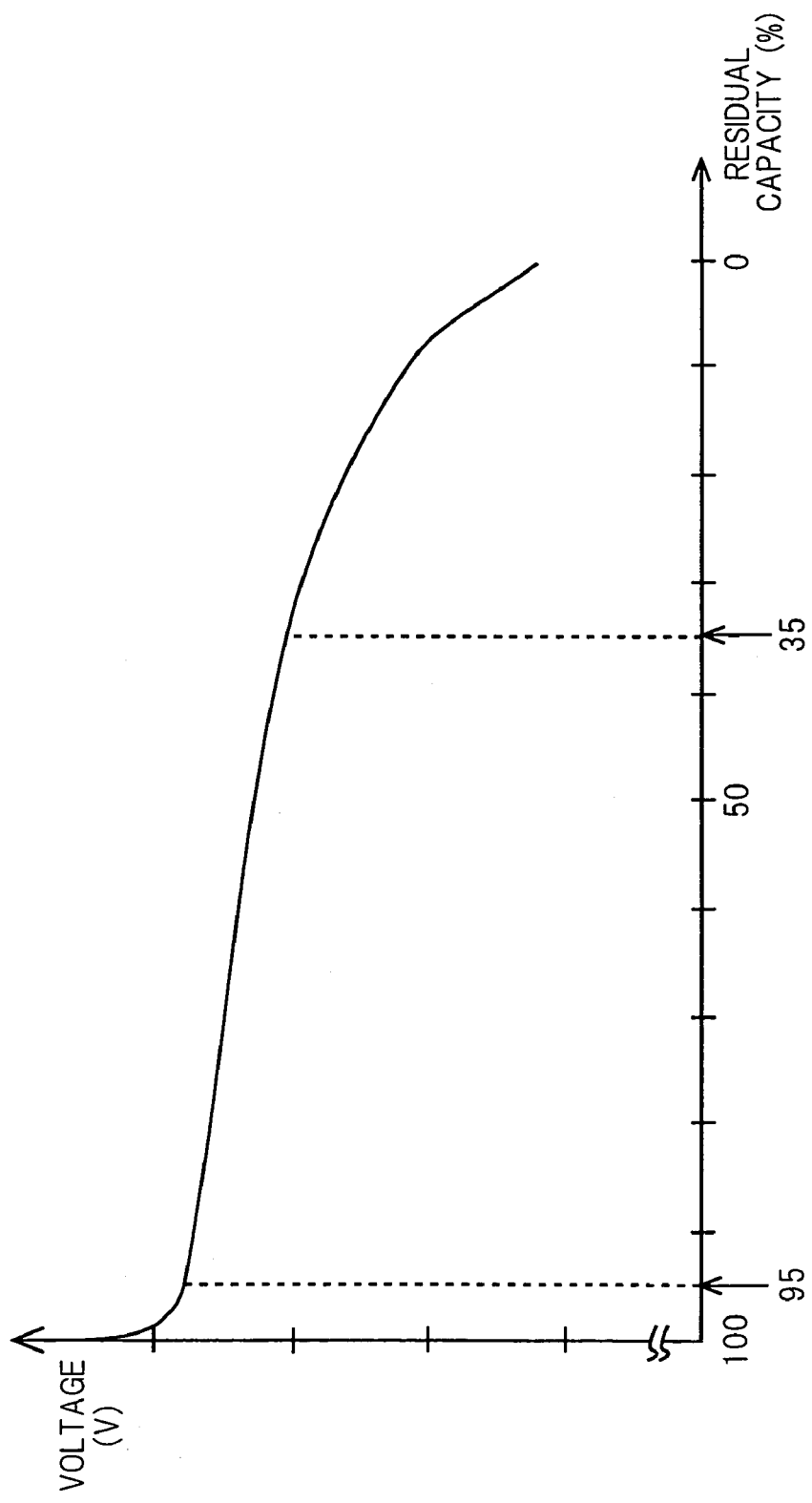
FIG. 4 is a graph showing discharge characteristic of a general secondary battery.

FIG. 4 is a graph showing discharge characteristic (residual capacity-voltage characteristic) of the general secondary battery (for example, lithium battery). In FIG. 4, a horizontal axis represents residual capacity (%) and a vertical axis represents output voltage (V). As shown in FIG. 4, the residual capacity of the secondary battery 120 can be found by detecting the output voltage of the secondary battery 120. The power supply unit 101 in accordance with the first embodiment of the present invention controls the residual capacity of the secondary battery 120 to fall within the scope of 35% to 95% so that the secondary battery 120 is not overcharged or overdischarged and that for example the secondary battery 120 has enough electric power to supply to the load by itself at all times until the fuel cell 116 comes to supply power after its activation.

The method for determining the power generation mode of the fuel cell of the power supply unit in accordance with the first embodiment will be described.

Figure 5:
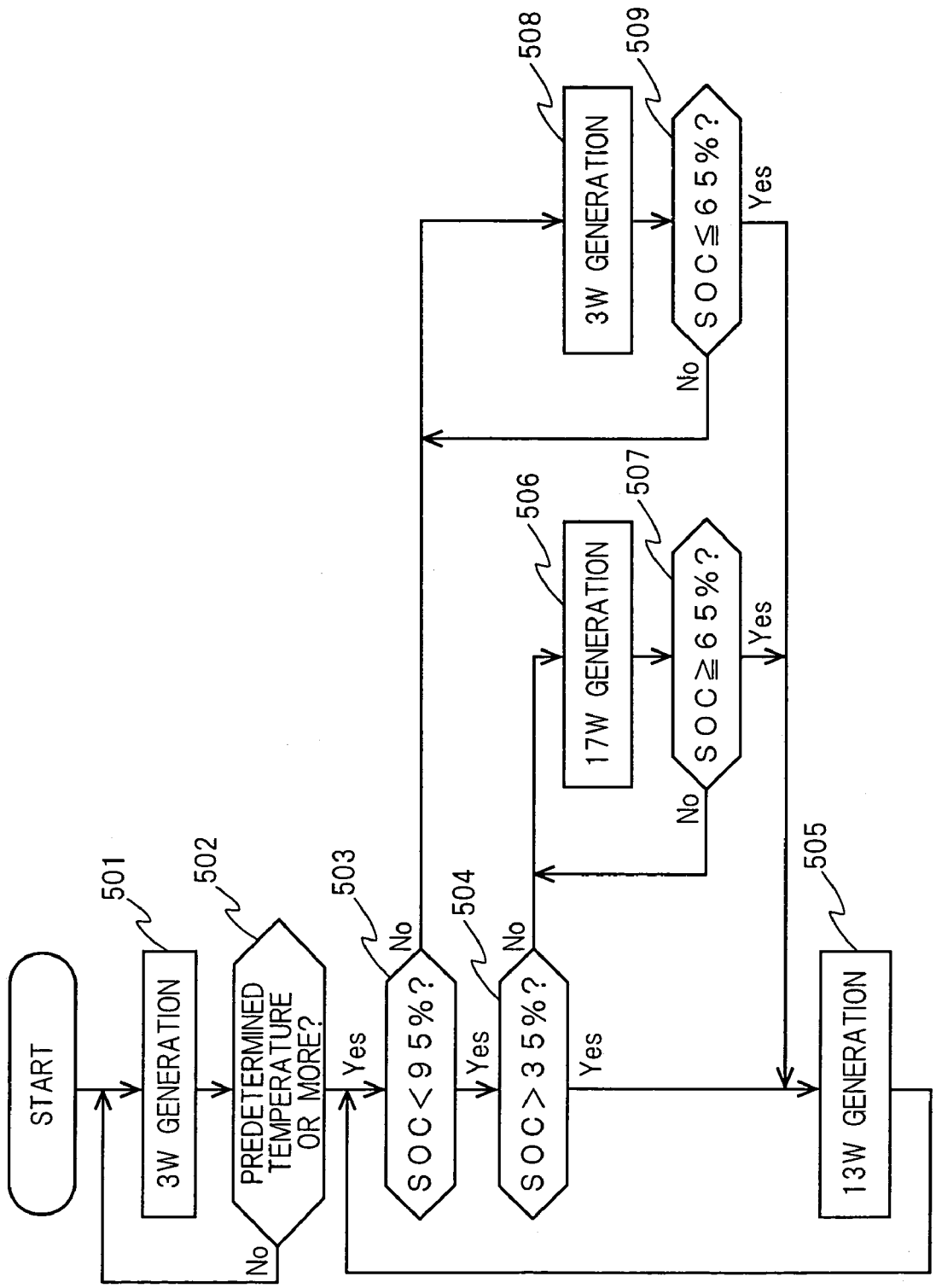
FIG. 5 is a flow chart showing shift of a power generation mode of the fuel cell of the power supply unit in accordance with the first embodiment of the present invention.

FIG. 5 is a flow chart showing shift of the power generation mode of the fuel cell of the power supply unit in accordance with the first embodiment of the present invention. In FIG. 5, when power is applied to the main unit 102, the fuel cell control part 117 puts the fuel cell 116 into the 3 W generation mode at a step 501. At a step 502, the fuel cell control part 117 determines whether or not the fuel cell 116 reaches at a predetermined temperature. Until the fuel cell 116 reaches at the predetermined temperature, the fuel cell control part 117 keeps the 3 W generation mode. The fuel cell 116 can generate power stably at the phase when the temperature of the fuel cell 116 reaches 40 to 60 centigrade. In other words, the fuel cell 116 cannot generate power sufficiently until the temperature of the stack 122 rises to 40 to 60 centigrade (Generally, it takes about 15 minutes to reach the temperature after application of power). Even if the fuel cell control part 117 sets, for example, the 17 W generation mode and a large amount of methanol is supplied to the fuel cell 116 until the fuel cell 116 reaches the predetermined temperature, the fuel cell 116 cannot deal with the large amount of methanol only to discharge it. In order to avoid such situation, the fuel cell control part 117 keeps the 3 W generation mode until the fuel cell 116 reaches the predetermined temperature. In the first embodiment, the predetermined temperature is 40 centigrade.

When the fuel cell 116 reaches the predetermined temperature, the operation proceeds to a step 503. At the step 503, the fuel cell control part 117 determines whether or not the residual capacity SOC of the secondary battery 120 is less than 95%. When the residual capacity SOC of the secondary battery 120 is less than 95%, the operation proceeds to a step 504. At the step 504, the fuel cell control part 117 determines whether or not the residual capacity SOC of the secondary battery 120 is greater than 35%. When the residual capacity SOC of the secondary battery 120 is greater than 35%, the operation proceeds to a step 505. At the step 505, the fuel cell control part 117 puts the fuel cell 116 into the 13 W generation mode. The operation returns to the step 503 and repeats the above-mentioned process.

At the step 504, when the residual capacity SOC of the secondary battery 120 is not greater than 35%, the operation proceeds to a step 506. At the step 506, the fuel cell control part 117 puts the fuel cell 116 into the 17 W generation mode. At the step 507, the fuel cell control part 117 determines whether or not the residual capacity SOC of the secondary battery 120 is not less than 65%. Until the residual capacity SOC of the secondary battery 120 reaches 65%, the operation returns to the step 506 and the fuel cell control part 117 keeps the 17 W generation mode. At the step 507, when the residual capacity SOC of the secondary battery 120 is not less than 65%, the operation proceeds to a step 505. At the step 505, the fuel cell control part 117 puts the fuel cell 116 into the 13 W generation mode. The operation returns to the step 503 and repeats the above-mentioned process.

At the step 503, when the residual capacity SOC of the secondary battery 120 is not less than 95%, the operation proceeds to a step 508. At the step 508, the fuel cell control part 117 puts the fuel cell 116 into the 3 W generation mode. At the step 509, the fuel cell control part 117 determines whether or not the residual capacity SOC of the secondary battery 120 is not greater than 65%. Until the residual capacity SOC of the secondary battery 120 becomes 65% or less, the operation returns to the step 508 and the fuel cell control part 117 keeps the 3 W generation mode. At the step 509, when the residual capacity SOC of the secondary battery 120 is not greater than 65%, the operation proceeds to a step 505. At the step 505, the fuel cell control part 117 puts the fuel cell 116 into the 13 W generation mode. The operation returns to the step 503 and repeats the above-mentioned process.

Figure 6:
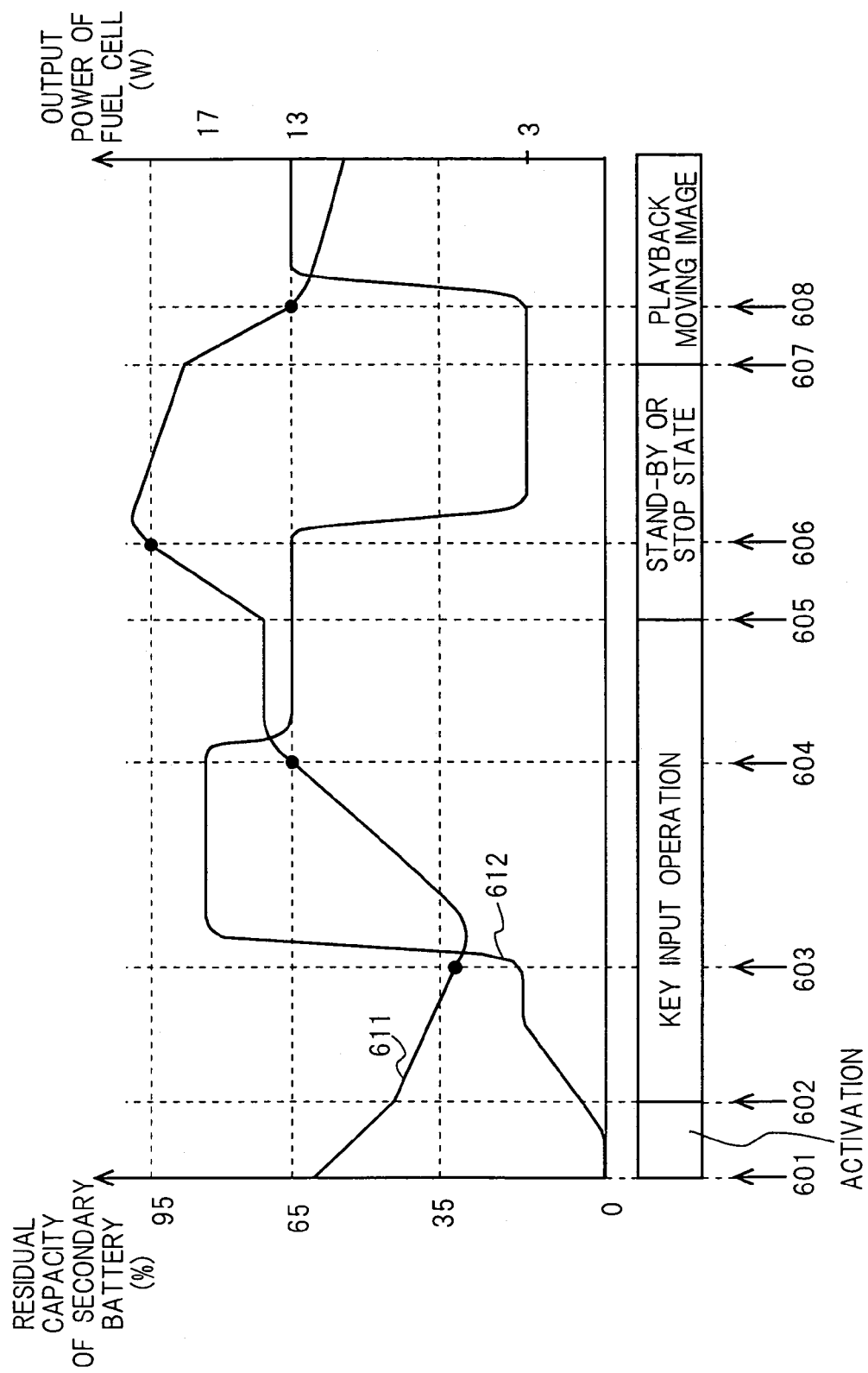
FIG. 6 is a view showing an example of change in the residual capacity of the secondary battery and the power generation mode of the fuel cell of the power supply unit in accordance with the first embodiment of the present invention.

Referring to FIG. 6, a method for controlling the power supply unit of the first embodiment will be specifically described. In FIG. 6, a horizontal axis represents time and a vertical axis represents residual capacity (%) 611 of the secondary battery 120 and output power (W) 612 of the fuel cell 116. However, time on the horizontal axis is represented in a reduced or magnified form for convenience.

At 601, power is applied to the main unit 102 to activate the main unit 102. The fuel cell 116 starts to generate power in the 3 W generation mode (step 501). During 601 to 602, the secondary battery 120 supplies (discharges) almost all of the average power consumption (14 W) required to activate the main unit 102 and the self-power consumption (3 W) of the fuel cell 116. At 602, the activation of the main unit 102 is finished and the main unit 102 performs key entry operation of word processor as an application software (third operation mode). During 602 to 603, the secondary battery 120 supplies (discharges) most of the operating power (10 W) and the self-power consumption (3 W) of the fuel cell 116. During 601 to 603, the residual capacity of the secondary battery decreases.

At 603, the fuel cell 116 reaches the predetermined temperature (Yes in the step 502). Based on the residual capacity of the secondary battery 120 (35% or less), the fuel cell control part 117 switches to the 17 W generation mode (step 506). When switched to the 17 W generation mode completely, the secondary battery 120 is charged with 4 W (The residual capacity of the secondary battery increases). At 604, the fuel cell control part 117 determines that the residual capacity of the secondary battery 120 is not less than 65% and switches to the 13 W generation mode (step 505). When switched to the 13 W generation mode completely, the secondary battery 120 is not charged or discharged (The residual capacity of the secondary battery 120 is constant).

At 605, the main unit 102 goes into a stand-by or stop state (fourth operation mode). During 605 to 606, the secondary battery 120 is charged with 9.5 W (The residual capacity of the secondary battery 120 increases). At 606, the fuel cell control part 117 determines that the residual capacity of the secondary battery 120 is not less than 95% and switches to the 3 W generation mode (step 508). When switched to the 3 W generation mode completely, the secondary battery 120 discharges 0.5 W (The residual capacity of the secondary battery 120 decreases moderately).

At 607, the main unit 102 starts to play back moving image (second operation mode). During 607 to 608, the secondary battery 120 discharges 14 W (The residual capacity of the secondary battery 120 decreases). At 608, the fuel cell control part 117 determines that the residual capacity of the secondary battery 120 is not greater than 65% and switches to the 13 W generation mode (step 505). Since 608, the secondary battery 120 discharges 4 W (The residual capacity of the secondary battery 120 decreases).

When the fuel cell 116 increases output power, the amount of fuel is increased and then the power supplied to the load 131 by the power converter 119 is increased. When the fuel cell 116 decreases output power, power supplied by the power converter 119 is decreased and then the amount of fuel is decreased. This can prevent the operating point of the fuel cell 116 from exceeding a of the output current-output voltage characteristic 201 on the right side in FIG. 2, thereby to decrease the output voltage of the fuel cell 116 sharply.

In the first embodiment, by varying the output power of the fuel cell with hysteresis, consecutive activation period in one power generation mode (constant output power) is lengthened, thereby to minimize the number of times of the switching of the power generation mode. The amount of discharged methanol can thus be minimized.

In the first embodiment, in comparison with the prior art circulating type fuel cell, available power output by the fuel cell with respect to supplied methanol can be increased to twice its amount.

Second Embodiment

Figure 7:
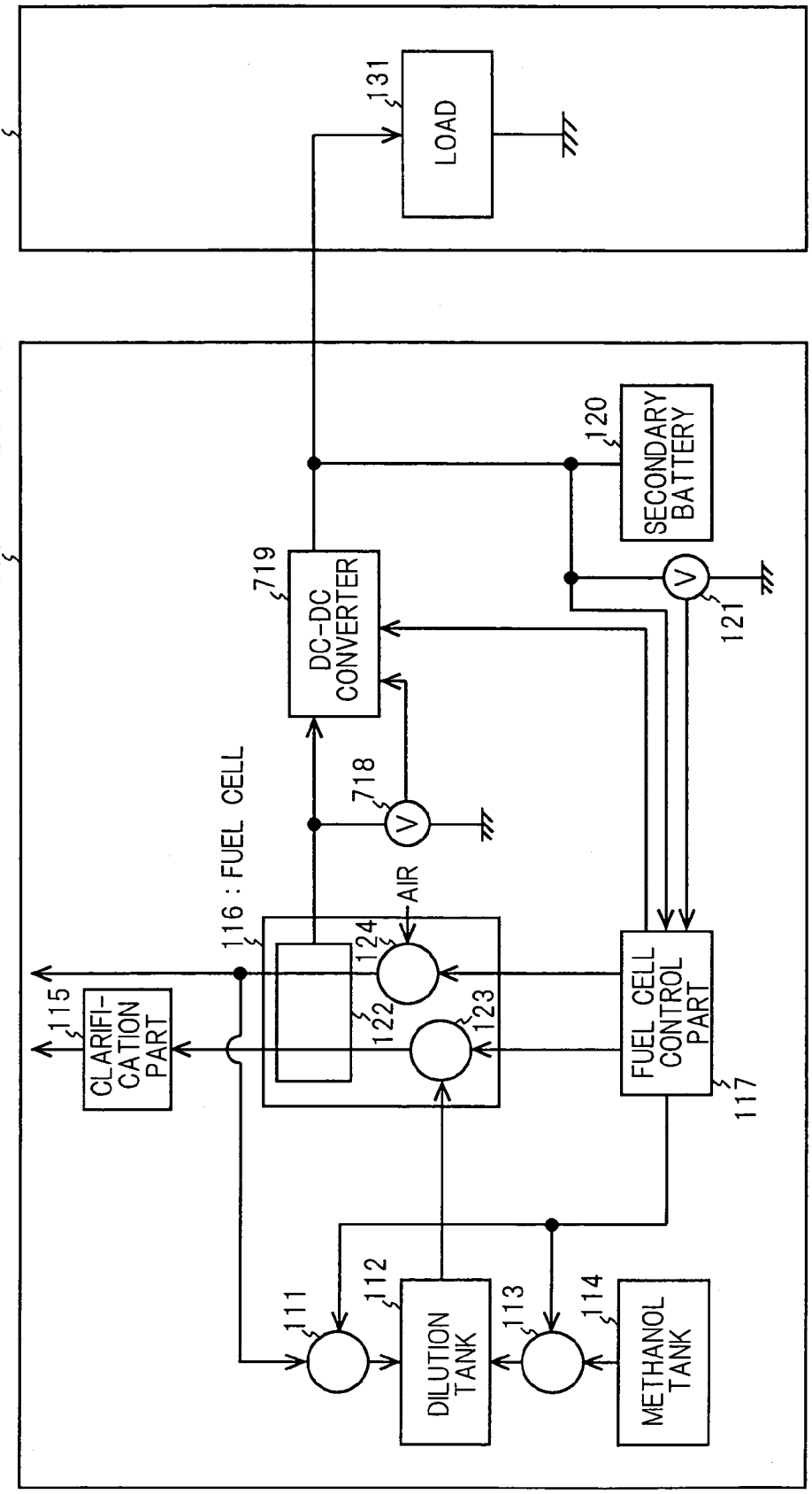
FIG. 7 is a block diagram showing the configuration of a power supply unit in accordance with a second embodiment of the present invention.
Figure 8:
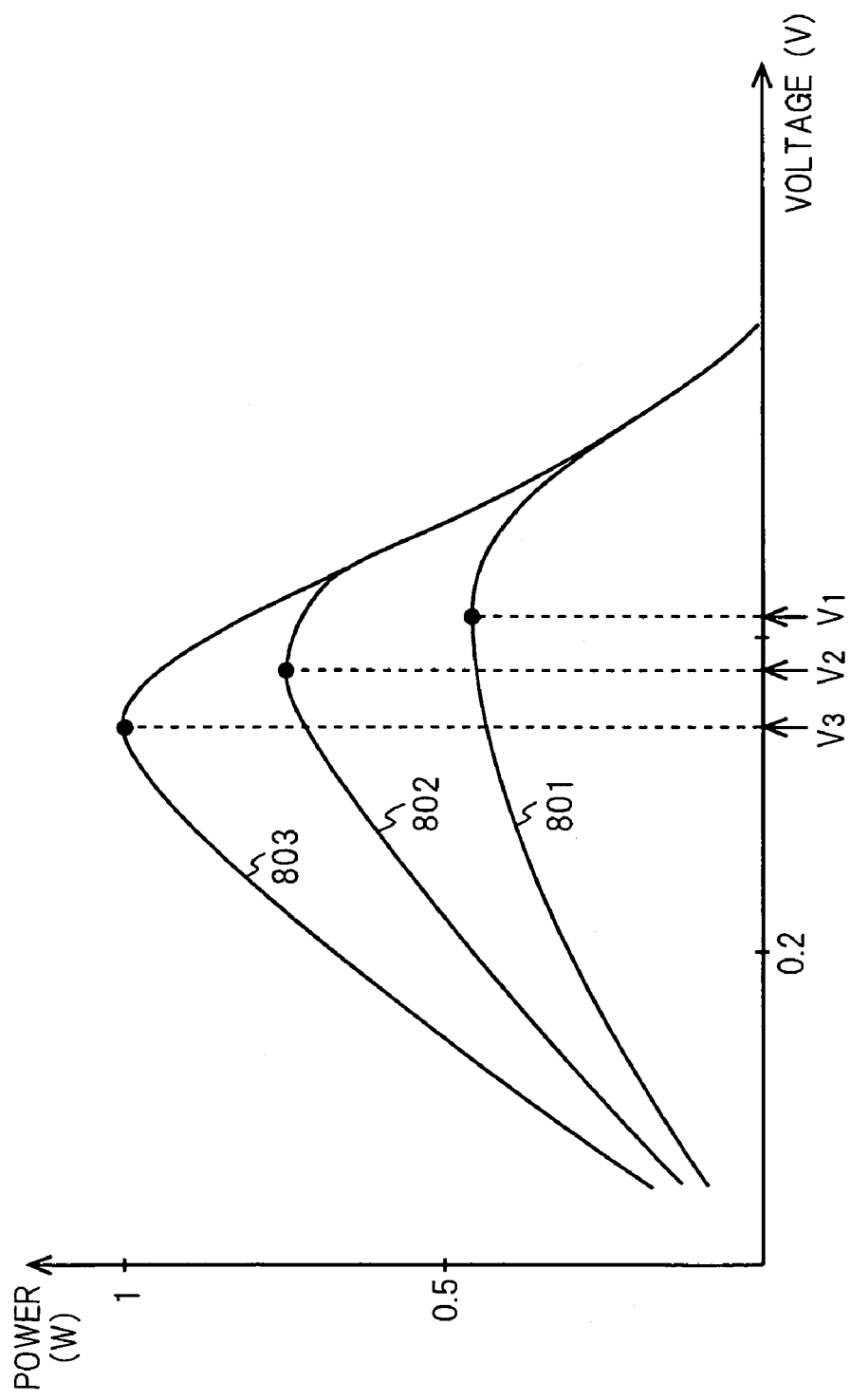
FIG. 8 is a graph showing output voltage-output power characteristic by amount of fuel of a balance type fuel cell of the power supply unit in accordance with the second embodiment of the present invention.
Figure 9:
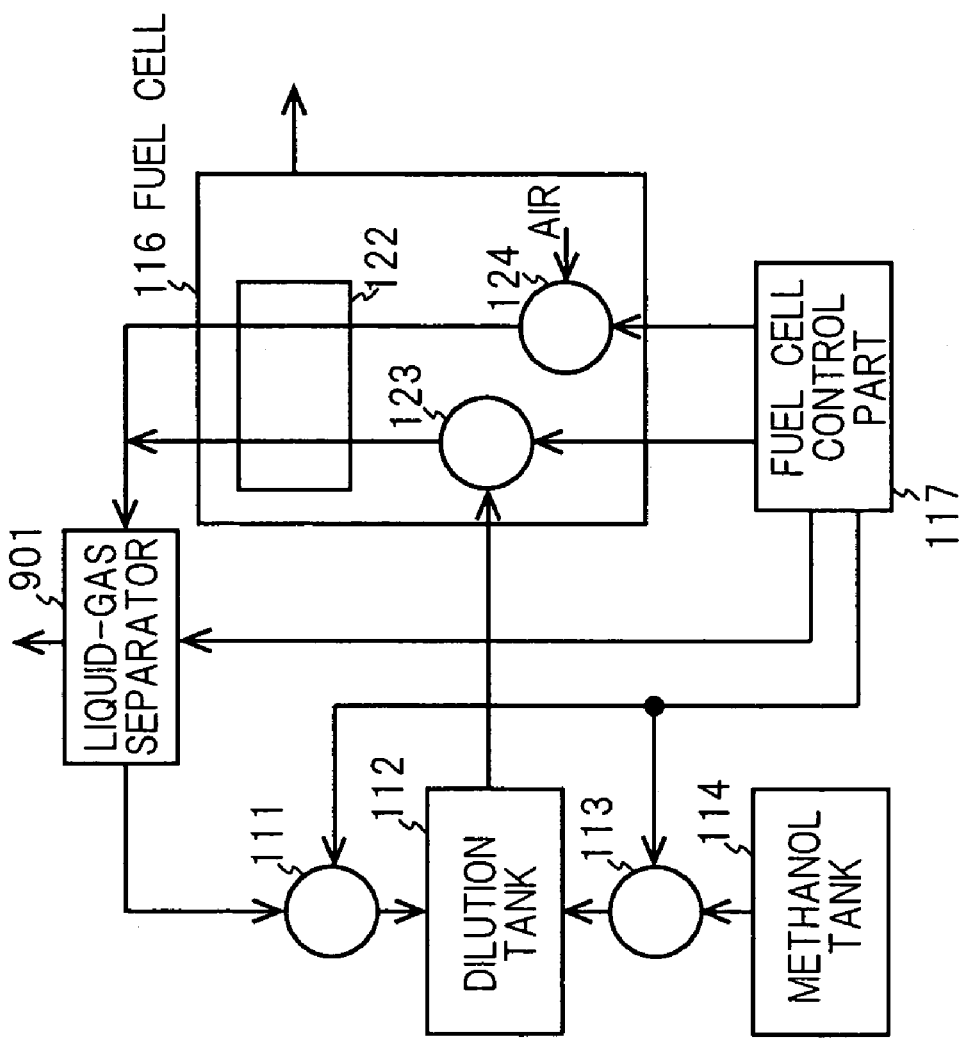
FIG. 9 is a block diagram showing the configuration of a prior art circulating type fuel cell.
Figure 10:
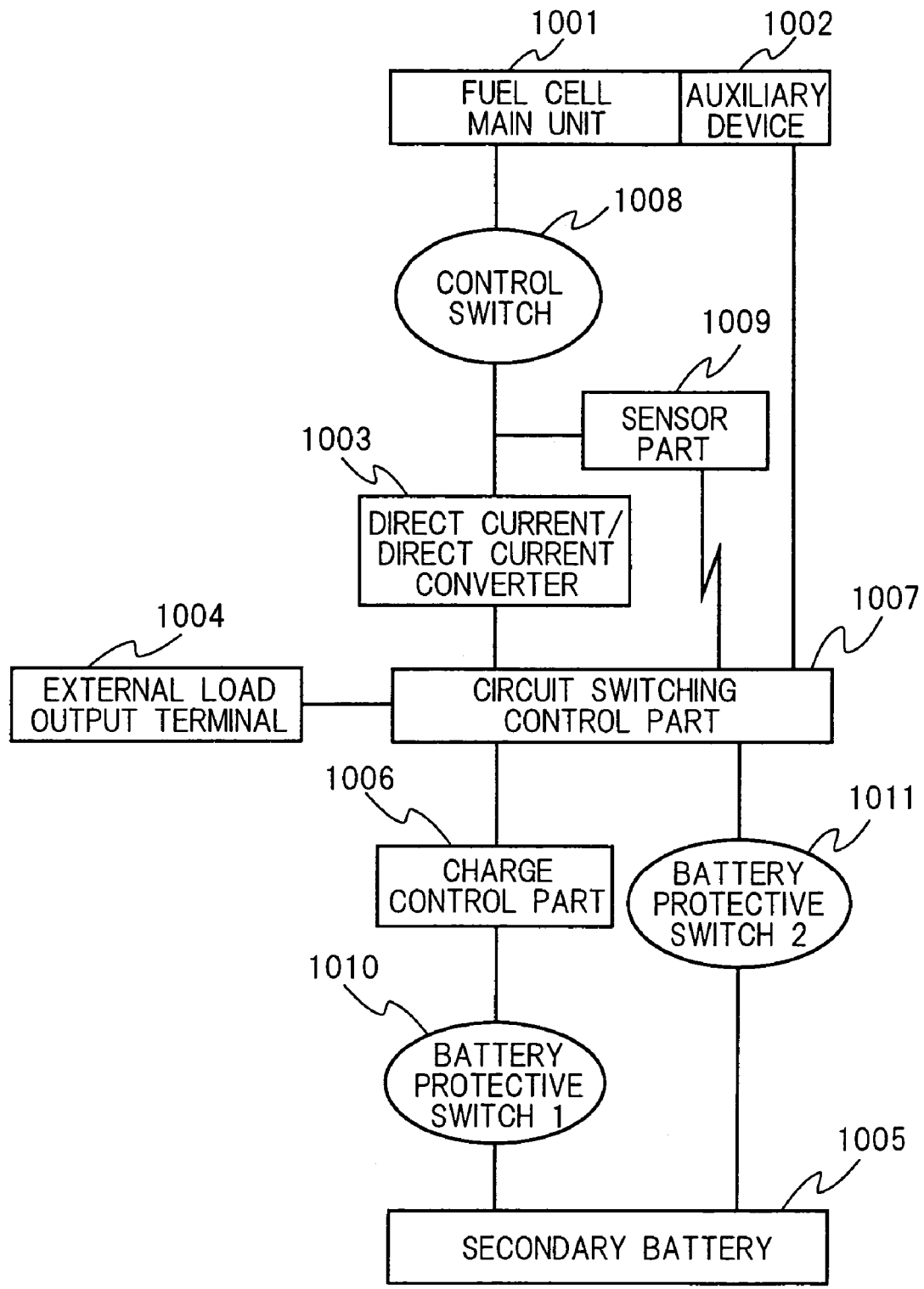
FIG. 10 is a block diagram showing the configuration of a fuel cell apparatus of a patent document 1.
Figure 11:
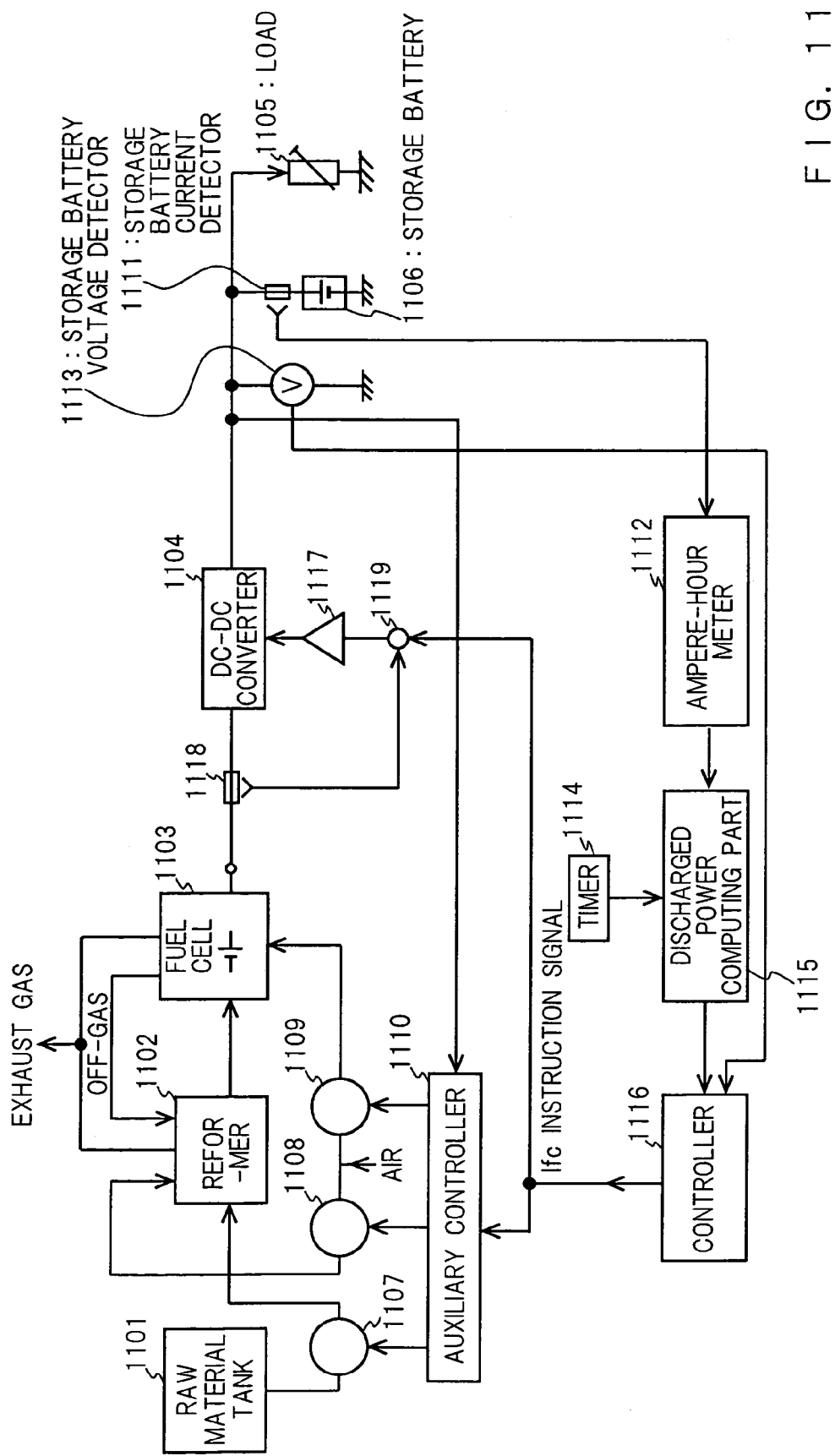
FIG. 11 is a block diagram showing the configuration of a control device of fuel cell power generation system of a patent document 2.
Figure 12:
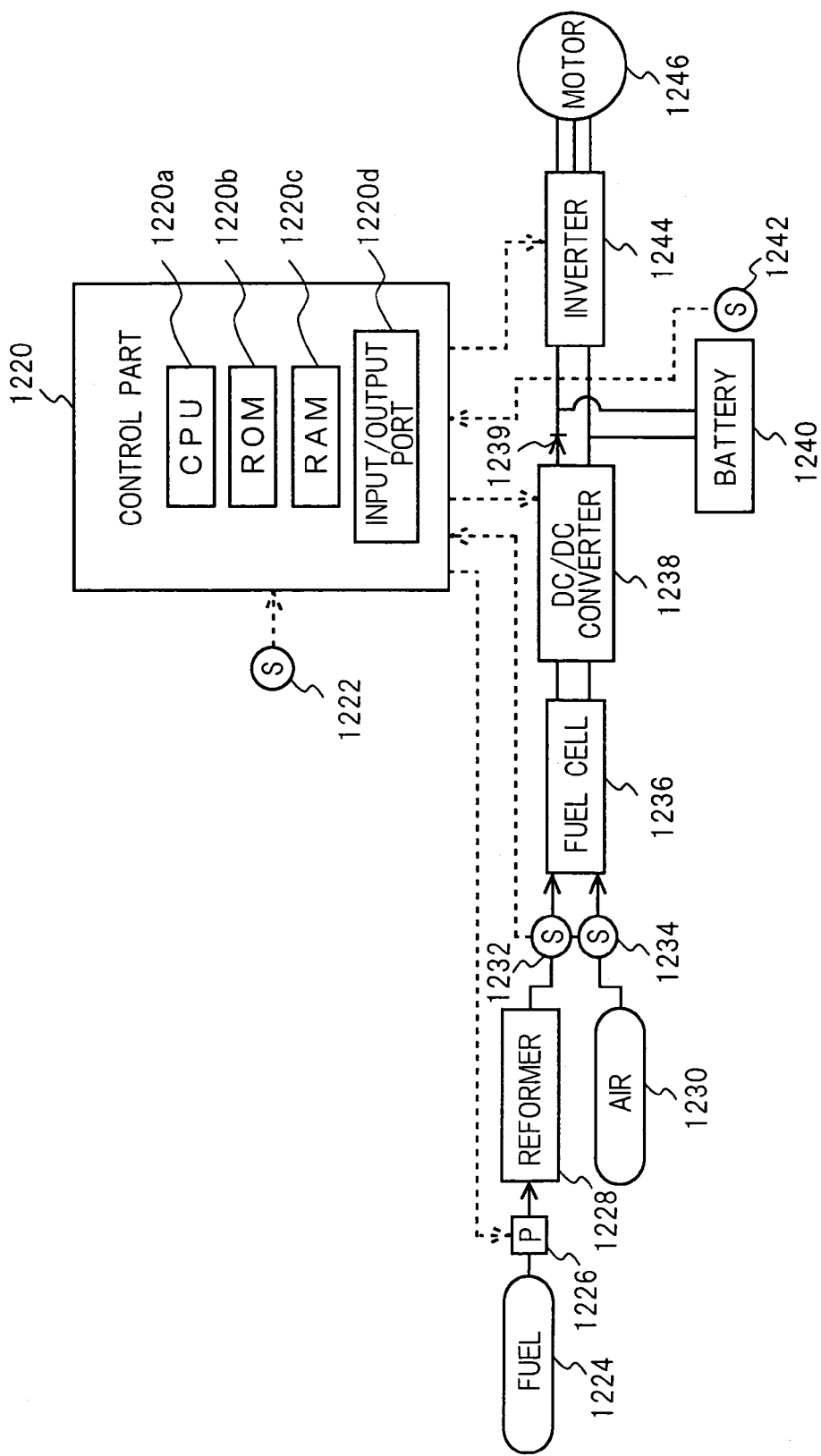
FIG. 12 is a block diagram showing the configuration of a fuel cell system of a patent document 3.

Referring to FIGS. 2, 7 and 8, a power supply unit in accordance with a second embodiment will be described. The DC-DC converter 119 in accordance with the first embodiment controls the output power so that the output current of the fuel cell 116 corresponds with the target current. A DC-DC converter 719 in accordance with the second embodiment controls the output power so that the output voltage of the fuel cell 116 corresponds with the target voltage.

Firstly, the configuration of the power supply unit in accordance with the second embodiment will be described. FIG. 7 is a block diagram showing the configuration of the power supply unit in accordance with the second embodiment. The power supply unit 701 of the second embodiment has a fuel cell output voltage detector 718 and the DC-DC converter 719 in exchange for the fuel cell output current detector 118 and the DC-DC converter 119 of the first embodiment. Except for these elements, the power supply unit 701 of the second embodiment is identical to that of the first embodiment. In FIG. 7, same numbers are assigned to blocks same as those in the first embodiment.

FIG. 7 shows the power supply unit 701 and the main unit 102. The power supply unit 701 has the return pump 111, the dilution tank 112, the methanol pump 113, the methanol tank 114, the clarification part 115, the fuel cell 116, the fuel cell control part 117, the fuel cell output voltage detector 718 for detecting output voltage of the fuel cell 116, the DC-DC converter 719, a secondary battery 120 and the secondary battery output voltage detector 121 for detecting voltage of the secondary battery 120. The fuel cell 116 has the stack 122, the fuel pump 123 and the air pump 124. The main unit 102 has the load 131. Description of the same blocks is omitted.

The fuel cell 116 is a balance type fuel cell using methanol as raw material. The secondary battery 120 is a lithium-ion secondary battery. The methanol tank 114 stores methanol ($CH_3OH$) of several % to 100% therein. The main unit 102 is a personal computer.

The fuel cell control part 117 has three power generation modes and feeds a certain amount of fuel per unit of time, which vary among power generation modes, to the fuel cell 116. The fuel cell control part 117 finds residual capacity of the secondary battery 120 from the output voltage of the secondary battery 120 detected by the secondary battery output voltage detector 121. Depending on the residual capacity of the secondary battery 120, the fuel cell control part 117 selects a power generation mode (controls the output power of the fuel cell 116). According to the selected power generation mode, the fuel cell control part 117 informs the DC-DC converter 719 of a target input voltage. As described in the first embodiment, when a certain amount of fuel is supplied to the fuel cell, relationship between output voltage and output current is represented as a definite function on a graph. The DC-DC converter 719 controls the output voltage so that the output voltage of the fuel cell 116 detected by the fuel cell output voltage detector 718 (input voltage of the DC-DC converter 719) corresponds with the target input voltage as far as possible. That is, the fuel cell 116 outputs a predetermined output power (=Output voltage of the fuel cell 116×output current corresponding to the output voltage), and the DC-DC converter 719 converts the output power of the fuel cell 116 and supplies the converted power to the load 131 and/or the secondary battery 120.

When the power output from the fuel cell 116 has a surplus even after being supplied to the main unit 102, the power supply unit 701 supplies the power output from the fuel cell 116 to the main unit 102 and charges the secondary battery 120 by the surplus power. When the power output from the fuel cell 116 is insufficient to be supplied to the main unit 102, the secondary battery 120 discharges the deficient power. The power supply unit 701 supplies combined power of the power output from the fuel cell 116 and the power discharged from the secondary battery 120 to the main unit 102. The method of controlling the fuel cell 116 is described in detail in the first embodiment.

FIG. 2 is a graph showing output current-output voltage characteristic, output current-output power characteristic and output current-methanol discharge rate characteristic by amount of fuel of the balance type fuel cell of the power supply unit in accordance with the second embodiment of the present invention. FIG. 2 has been already described. The output current-output voltage characteristic and output current-output power characteristic of the fuel cell 116 vary depending on the amount of fuel supplied to the fuel cell 116. Once the amount of fuel is determined to be a certain value, the output current-output voltage characteristic and output current-output power characteristic with the amount of fuel are determined uniquely.

In FIG. 2, in the case where the amount of fuel is 0.1 cc/min, the output power of the fuel cell 116 becomes maximized at a voltage $V_1$ and a current $A_1$. In the case where the amount of fuel is 0.2 cc/min, the output power of the fuel cell 116 becomes maximized at a voltage $V_2$ and a current $A_2$. In the case where the amount of fuel is 0.3 cc/min, the output power of the fuel cell 116 becomes maximized at a voltage $V_3$ and a current $A_3$. The power supply unit 701 of the second embodiment controls the output of the fuel cell 116 at a constant voltage.

The balance type fuel cell in accordance with the second embodiment of the present invention feeds a certain amount of fuel per unit of time to the fuel cell 116 in each power generation mode and generates power in the range from the voltage value at which output power becomes maximized with the amount of fuel to the value less than the above-mentioned voltage value by a predetermined value. The above-mentioned range is determined depending on the amount of fuel.

Based on the output current-output voltage characteristic and output current-output power characteristic using the amount of fuel as parameter (for example, FIGS. 2, 8), the fuel cell control part 117 of the power supply unit 701 in accordance with the second embodiment correlates a certain amount of fuel in each power generation mode with a target output voltage value corresponding to the amount of fuel (within the range from voltage value at which the output power becomes maximized with the amount of fuel to the value less than the above-mentioned voltage value by a predetermined value and stores them therein. The fuel cell control part 117 informs the DC-DC converter 719 of the target output voltage value corresponding to the amount of fuel. For example, when methanol of 0.1 cc/min is supplied to the stack 122, the fuel cell control part 117 instructs the DC-DC converter 719 so that the output voltage value of the fuel cell 116 falls within the range of V1 to V1−β (β is a positive number) based on the above-mentioned characteristic graph. In the first and second embodiments, target operating points are substantially same. Taking the fuel of 0.3 cc/min for example (output current-output voltage characteristic 203), the point determined by the target current for constant current control in the first embodiment and the target voltage for constant voltage control in the second embodiment locates on the output current-output voltage characteristic 203.

In the first embodiment, the output of the fuel cell 116 is controlled at constant current. The range in which the output current value of the fuel cell 116 is the value at which the output power becomes maximized or more and at which the output voltage of the fuel cell 116 is maintained to be a constant value or more is narrow (When the current exceeds a predetermined range, the output voltage decreases rapidly). For this reason, an acceptable range of the current in constant current control is narrow (The constant current control must be carried out with a high degree of accuracy). On the other hand, in the second embodiment, the output of the fuel cell 116 is controlled at constant voltage. As shown in FIG. 2, in the region where the voltage value is not greater than the value at which the output power of the fuel cell 116 becomes maximized, the range in which the output voltage value of the fuel cell 116 is the value at which the output power becomes maximized or less and at which the output voltage of the fuel cell 116 is maintained to be a constant value or more is relatively large. In the case where the output voltage of the fuel cell 116 becomes lower than the target value by a predetermined value or more, the output voltage is not likely to decrease sharply as in the case where the output current becomes higher than the target value by a predetermined value or more. Therefore, the constant-voltage balance type fuel cell in accordance with the second embodiment can exert more easily and supply electric power more stably than the constant-current balance type fuel cell in accordance with the first embodiment.

For comparison with the first embodiment (constant-current type), description is made on the basis of current referring to FIG. 2. As the fuel cell of the power supply unit in accordance with the second embodiment is a constant-voltage type one, description will be made on the basis of voltage referring to FIG. 8.

FIG. 8 is a graph showing output voltage-output power characteristic by amount of fuel of a balance type fuel cell of the power supply unit in accordance with the second embodiment of the present invention. FIG. 8 is rewritten by replacing current of horizontal axis in FIG. 2 with voltage. In FIG. 8, a horizontal axis represents output voltage (V) and a vertical axis represents output power (W). Numerals 801, 802 and 803 represent output voltage-output power characteristic in the case of the amount of fuel of 0.1 cc/min, 0.2 cc/min and 0.3 cc/min, respectively. The inclination of the output voltage-output power characteristic in the region where the voltage value is lower than the value at which the output power becomes maximized in FIG. 8 is much modest than that of the output current-output power characteristic in the region where the current value is higher than the value at which the output power becomes maximized in FIG. 2. This means that constant voltage control in the second embodiment is much easier than constant current control in the first embodiment.

In the second embodiment, the DC-DC converter controls the output power of the fuel cell so that the output voltage of the fuel cell becomes the target voltage, enabling to supply power more stably than the first embodiment.

Here, the power supply unit 701 of the second embodiment realizes the same fuel utilization rate as that of the first embodiment (FIG. 3).

Although a lithium-ion battery is used as the secondary battery in the first and second embodiments, other type of secondary battery such as lead acid battery, nickel-cadmium storage battery and nickel hydrogen battery may be used.

Although the main unit 102 is a personal computer in the first and second embodiments, other device requiring a power supply may be used.

In FIG. 5, in the first and second embodiments, even if the power generation mode is either the 17 W generation mode or 3 W generation mode, it is switched to the 13 W generation mode with reference to an intermediate threshold (residual capacity SOC is 65%) (steps 507, 509). Instead of this, a different intermediate threshold may be set for each generation mode. For example, the fuel cell control part 117 determines whether or not the residual capacity SOC of the secondary battery 120 is not less than 75% in the step 507 and determines whether or not the residual capacity SOC of the secondary battery 120 is not greater than 55% in the step 509. A first intermediate threshold at the time when the 3 W generation mode is switched to the 13 W generation mode (when the residual capacity of the secondary battery 120 decreases) (step 509) may be larger or smaller value than a second intermediate threshold at the time when the 17 W generation mode is switched to the 13 W generation mode (when the residual capacity of the secondary battery 120 increases) (step 507).

In the above-mentioned embodiments, the power supply unit has three power generation modes. However, it is not limited to three and the power supply unit may have n number of generation modes (n is positive integral number more than 1).

In the first embodiment, the power supply unit sets the value that equals the output current value of the fuel cell in the state where the output-power substantially becomes maximized or more as a target current value. Instead of this, insofar as methanol discharged from the fuel cell does not increase so much, the target current value may be a value smaller than the output current value of the fuel cell in the state where the output power substantially becomes maximized. In the second embodiment, the power supply unit sets the value that equals the output voltage value of the fuel cell in the state where the output power substantially becomes maximized or less as a target voltage value. Instead of this, insofar as methanol discharged from the fuel cell does not increase so much, the target voltage value may be a value larger than the output voltage value of the fuel cell in the state where the output power substantially becomes maximized. However, the configurations of the first and second embodiments are more desirable.

In the present invention, It is possible to realize a power supply unit with a separator and also a power supply unit without a separator.

The power supply unit of the present invention is useful as a power supply unit for various equipments such as personal computer.

According to the present invention, it is possible to obtain the advantageous effect of realizing a power supply unit that can supply power necessary for the main unit without varying the output power of the fuel cell frequently.

According to the present invention, since the fuel cell discharges only a very little amount of methanol, it is possible to obtain the advantageous effect of realizing a clean power supply unit by being equipped with a clarification part of simple configuration.

According to the present invention, it is possible to obtain the advantageous effect of realizing a power supply unit with an excellent fuel utilization rate.

According to the present invention, as the output power of the fuel cell is determined depending on the residual capacity of the secondary battery, it is possible to obtain the advantageous effect of realizing a power supply unit of simple configuration.

According to the present invention, it is possible to obtain the advantageous effect of realizing a compact and low-cost power supply unit that discharges only a very little amount of methanol. While preferred embodiments of the present invention have been described in detail to a certain degree, it is to be understood that, within the scope and spirit of the claims made herein, the invention may be practiced otherwise than as specifically described herein, the invention may be modified in arrangement and detail without departing from such scope and spirit.

The invention claimed is:

1. A power supply unit comprising:
  a fuel cell that uses methanol as fuel and air to output a power;
  a secondary battery that supplies power to a load;
  fuel cell control means for establishing at least three different power generation modes based at least in part on a residual capacity of the secondary battery and controlling introduction of a different and predetermined amount of fuel to the fuel cell in each of the power generation modes to achieve a desired output power corresponding to each of the power generation modes, wherein the fuel cell outputs electric power in each of the three power generation modes;

controller means for determining a target value of current or voltage of the fuel cell based on the amount of fuel supplied to the fuel cell, the target value falling within a predetermined range including the value at which an amount of methanol discharged from the fuel cell is minimized;

a power converter that converts the power output from the fuel cell to a voltage or current, controls the converted voltage or current based on the target value, and supplies the load and/or the secondary battery with a power based on the controlled voltage or current of the fuel cell; and a secondary battery residual capacity detector that detects the residual capacity of said secondary battery;

wherein the fuel cell control means comprises:

means for switching the amount of fuel supplied to said fuel cell from a first value to a second value that is greater than the first value in response to the residual capacity of said secondary battery decreasing to a first residual capacity, and means for switching the amount of fuel supplied to said fuel cell from the second value to the first value in response to the residual capacity of said secondary battery increasing and reaching a second residual capacity that is greater than said first residual capacity.

2. A power supply unit as stated in claim 1, wherein said secondary battery residual capacity detector detects the residual capacity of said secondary battery based on the voltage of said secondary battery.

3. A power supply unit as stated in claim 1, wherein said fuel cell is a balance type fuel cell in which the output power of said fuel cell depends on the amount of fuel supplied to the fuel cell.

4. A power supply unit as stated in claim 1, wherein said three values are a maximum value, an intermediate value and a minimum value, in the state where the amount of fuel supplied to said fuel cell is the intermediate value, when the residual capacity of said secondary battery reaches a maximum threshold, the amount of fuel supplied to said fuel cell is switched to the minimum value, in the state where the amount of fuel supplied to said fuel cell is the minimum value, when the residual capacity of said secondary battery decreases and reaches an intermediate threshold, the amount of fuel supplied to said fuel cell is switched to the intermediate value, in the state where the amount of fuel supplied to said fuel cell is the intermediate value, when the residual capacity of said secondary battery decreases and reaches a minimum threshold, the amount of fuel supplied to said fuel cell is switched to the maximum value, and in the state where the amount of fuel supplied to said fuel cell is of maximum value, when the residual capacity of said secondary battery increases and reaches said intermediate threshold, the amount of fuel supplied to said fuel cell is switched to the intermediate value.

5. A power supply unit as stated in claim 1, wherein said three values are a maximum value, an intermediate value and a minimum value, in the state where the amount of fuel supplied to said fuel cell is the intermediate value, when the residual capacity of said secondary battery reaches a maximum threshold, the amount of fuel supplied to said fuel cell is switched to the minimum value, in the state where the amount of fuel supplied to said fuel cell is the minimum value, when the residual capacity of said secondary battery decreases and reaches a first intermediate threshold, the amount of fuel supplied to said fuel cell is switched to the intermediate value, in the state where the amount of fuel supplied to said fuel cell is the intermediate value, when the residual capacity of said secondary battery decreases and reaches a minimum threshold, the amount of fuel supplied to said fuel cell is switched to the maximum value, and in the state where the amount of fuel supplied to said fuel cell is of maximum value, when the residual capacity of said secondary battery increases and reaches a second intermediate threshold, the amount of fuel supplied to said fuel cell is switched to the intermediate value.

6. A power supply unit as stated in claim 1, wherein when said fuel cell increases the output power, the amount of fuel is increased and then the power supplied by said power converter is increased, and when said fuel cell decreases the output power, the power supplied by said power converter is decreased and then the amount of fuel is decreased.

7. A power supply unit as stated in claim 1, wherein the power generation modes include a minimum mode where the amount of fuel supplied to said fuel cell is a minimum value and the output power of said fuel cell is substantially same as a self-power consumption of the power supply unit, the self-power consumption being a power which the power supply unit consumes when driving only the fuel cell.

8. A power supply unit as stated in claim 1, wherein the power generation modes include a minimum mode where the amount of fuel supplied to said fuel cell is the minimum value, and when said power supply unit starts to supply power, said fuel cell control part selects the minimum mode.

9. A power supply method capable of supplying a power to a power supply unit having a fuel cell and a secondary battery, comprising:

controlling an amount of fuel and/or air supplied to the fuel cell, the fuel cell using methanol as fuel and air to output a power;

determining a target value of voltage or current of the fuel cell based on the amount of fuel supplied to the fuel cell, the target value falling within a predetermined range including the value at which an amount of methanol discharged from the fuel cell is minimized;

converting the power output from the fuel cell to a current or voltage, controlling the converted current or voltage based on the target value, and supplying a load and/or the secondary battery with a power depending on the controlled current or voltage of the fuel cell, and detecting a residual capacity of said secondary battery;

wherein at least three different power generation modes are provided, and in each mode, a different and predetermined amount of fuel per unit of time is supplied to the fuel cell to output the power, one of at least three different power generation modes is selected based on at least residual capacity of said secondary battery and the predetermined amount of fuel is supplied to the fuel cell based on selected power generation mode, wherein when the residual capacity of said secondary battery decreases and reaches a first residual capacity, the amount of fuel supplied to said fuel cell is switched from a first value to a second value greater than said first value, and when the residual capacity of said secondary battery increases and reaches the seconded residual capacity greater than said first residual capacity, the amount of fuel supplied to said fuel cell is switched from said second value to said first value.

10. The power supply unit of claim 4, wherein the minimum threshold of the residual capacity of the secondary battery is less than the maximum threshold of the residual capacity of the secondary battery, and the intermediate threshold of the residual capacity of the secondary battery is disposed between the minimum threshold and maximum threshold.

* * * * *